US012804662B2

(12) United States Patent
Chen et al.

(10) Patent No.: US 12,804,662 B2
(45) Date of Patent: Nov. 17, 2026

(54) SWITCHING FOR SINGLE-FREQUENCY NETWORK (SFN) PHYSICAL UPLINK SHARED CHANNEL (PUSCH) COMMUNICATION SCHEME

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 579 days.

(21) Appl. No.: 17/813,770

(22) Filed: Jul. 20, 2022

(65) Prior Publication Data

US 2024/0032045 A1 Jan. 25, 2024

(51) Int. Cl.

*H04W 72/23* (2023.01)
*H04L 5/00* (2006.01)
*H04W 72/1268* (2023.01)

(52) U.S. Cl.

CPC ........... *H04W 72/23* (2023.01); *H04L 5/0051* (2013.01); *H04W 72/1268* (2013.01)

(58) Field of Classification Search

None
See application file for complete search history.

(56) References Cited

U.S. PATENT DOCUMENTS

2021/0410148 A1 12/2021 Venugopal et al.
2023/0171705 A1* 6/2023 Go ........................ H04W 52/42 370/318
2023/0300832 A1* 9/2023 Zhang ................... H04L 5/0053 370/329
2023/0345493 A1* 10/2023 Cirik ......................... H04L 1/08
2024/0267175 A1* 8/2024 Matsumura ........... H04L 5/0035
2024/0333370 A1* 10/2024 Kim ....................... H04B 7/024
2025/0141499 A1* 5/2025 Kang .................... H04W 72/12
2025/0168851 A1* 5/2025 Ling ..................... H04W 72/04
2025/0193889 A1* 6/2025 Muruganathan ...... H04L 5/0023

(Continued)

FOREIGN PATENT DOCUMENTS

CN 113748637 A 12/2021
WO 2022040907 A1 3/2022

OTHER PUBLICATIONS

International Search Report and Written Opinion—PCT/US2023/070486—ISA/EPO—Oct. 24, 2023.

(Continued)

*Primary Examiner* — Saumit Shah
(74) *Attorney, Agent, or Firm* — Dinsmore & Shohl LLP

(57) ABSTRACT

Various aspects of the present disclosure generally relate to wireless communication. In some aspects, a user equipment (UE) may receive downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously from multiple antenna modules of the UE. The UE may transmit the PUSCH communication in accordance with the DCI. Numerous other aspects are described.

22 Claims, 13 Drawing Sheets

(56) References Cited

U.S. PATENT DOCUMENTS

2025/0274961 A1 * 8/2025 Lim .................... H04B 7/0628

OTHER PUBLICATIONS

Qualcomm Incorporated: "Simultaneous Multi-Panel Transmission", R1-2205019, 3GPP TSG-RAN WG1 Meeting #109-e, 3rd Generation Partnership Project, Mobile Competence Centre, 650, Route Des Lucioles, F-06921 Sophia-Antipolis Cedex, France, vol. RAN WG1, No. E-Meeting, May 9, 2022-May 20, 2022, Apr. 29, 2022, XP052203881, 10 pages, Section 2, Proposal 2, p. 2, figure 1.

Vivo: "Views on UL Preceding Indication for Multi-panel Transmission", 3GPP TSG RAN WG1 #109-e, R1-2203546, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 11 Pages, XP052153021, Section 2.2.3.

ZTE: "Enhancements on UL Preceding Indication for Multi-panel Transmission", 3GPP TSG RAN WG1 Meeting #109-e, R1-2203268, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 11 Pages, XP052152904, Section 3 "Transmission scheme of STxUL to MTRP", figure 1b.

* cited by examiner

SWITCHING FOR SINGLE-FREQUENCY NETWORK (SFN) PHYSICAL UPLINK SHARED CHANNEL (PUSCH) COMMUNICATION SCHEME

BACKGROUND

Field of the Disclosure

Aspects of the present disclosure relate to wireless communications, and more particularly, to techniques for switching for a single-frequency network (SFN) physical uplink shared channel (PUSCH) communication scheme.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously using multiple antenna modules of the UE. The method further includes transmitting the PUSCH communication in accordance with the DCI.

Another aspect provides a method for wireless communication by a network entity. The method includes transmitting DCI that includes an indication to transmit a PUSCH communication, associated with the DCI, using a SFN communication scheme in which each layer of the PUSCH communication is transmitted simultaneously using multiple antenna modules of a UE. The method further includes receiving the PUSCH communication in accordance with the DCI.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
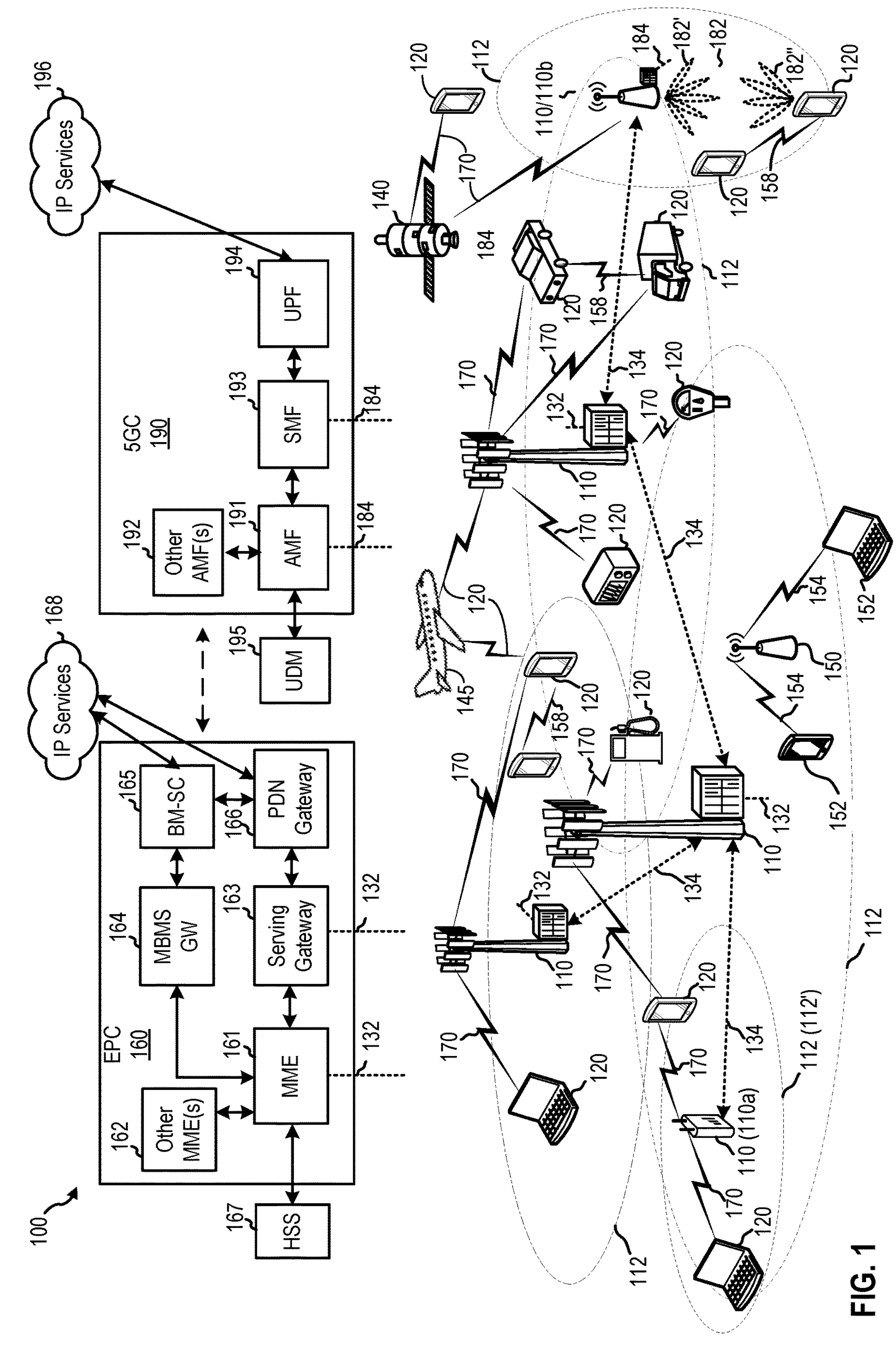
FIG. 1 depicts an example wireless communications network.

Aspects of the present disclosure provide apparatuses, methods, processing systems, and computer-readable mediums for switching for a single-frequency network (SFN) physical uplink shared channel (PUSCH) communication scheme.

A UE may be capable of transmitting a PUSCH using various communication schemes. A communication scheme may indicate a configuration for transmitting a PUSCH, such as a number of sounding reference signal (SRS) resource sets for transmission of the PUSCH, a distribution of time, frequency, or spatial resources used for transmission of the PUSCH, a number of transmission reception points (TRPs) to which the PUSCH is to be transmitted, and so on. Examples of communication schemes include a spatial division multiplexing (SDM) communication scheme, a frequency division multiplexing (FDM) communication scheme, a time division multiplexing (TDM) communication scheme, a single TRP communication scheme, and an SFN communication scheme. A PUSCH transmission is generally scheduled by downlink control information (DCI). A user equipment (UE) supporting multiple communication schemes for PUSCH transmission may benefit from switching between different communication schemes, such as based on channel conditions, available resources, UE capabilities, and so on. However, semi-static configuration of an active communication scheme (such as via radio resource control (RRC) signaling) may not provide sufficient flexibility and adaptability for communication scheme switching, and may involve significant latency.

Some techniques described herein provide signaling associated with indicating a communication scheme for PUSCH transmission. For example, the UE may receive an indication (e.g., DCI, from a network entity) indicating a selected communication scheme. In some aspects, the indication may indicate whether to use an SFN communication scheme. If the indication indicates whether to use an SFN communication scheme, overhead may be reduced relative to indicating a selected communication scheme (e.g., of an FDM communication scheme, a TDM communication scheme, and/or an SDM communication scheme), since the UE may not need to indicate an order associated with the FDM communication scheme, the TDM communication scheme, or the SDM communication scheme, as described elsewhere herein. In some aspects, the indication may indicate a selected communication scheme (e.g., of an FDM communication scheme, a TDM communication scheme, an SDM communication scheme, a single TRP communication scheme, or an SFN communication scheme), which increases flexibility of communication scheme switching.

In this way, latency associated with switching communication schemes is reduced relative to semi-static configuration of a communication scheme.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) device, always on (AON) device, edge processing device, or another similar device. A UE 120 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

BSs 110 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. A BS 110 may provide communications coverage for a respective geographic coverage area 112, which may sometimes be referred to as a cell, and which may overlap in some cases (e.g., a small cell provided by a BS 110*a* may have a coverage area 112' that overlaps the coverage area 112 of a macro cell). A BS may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 2:
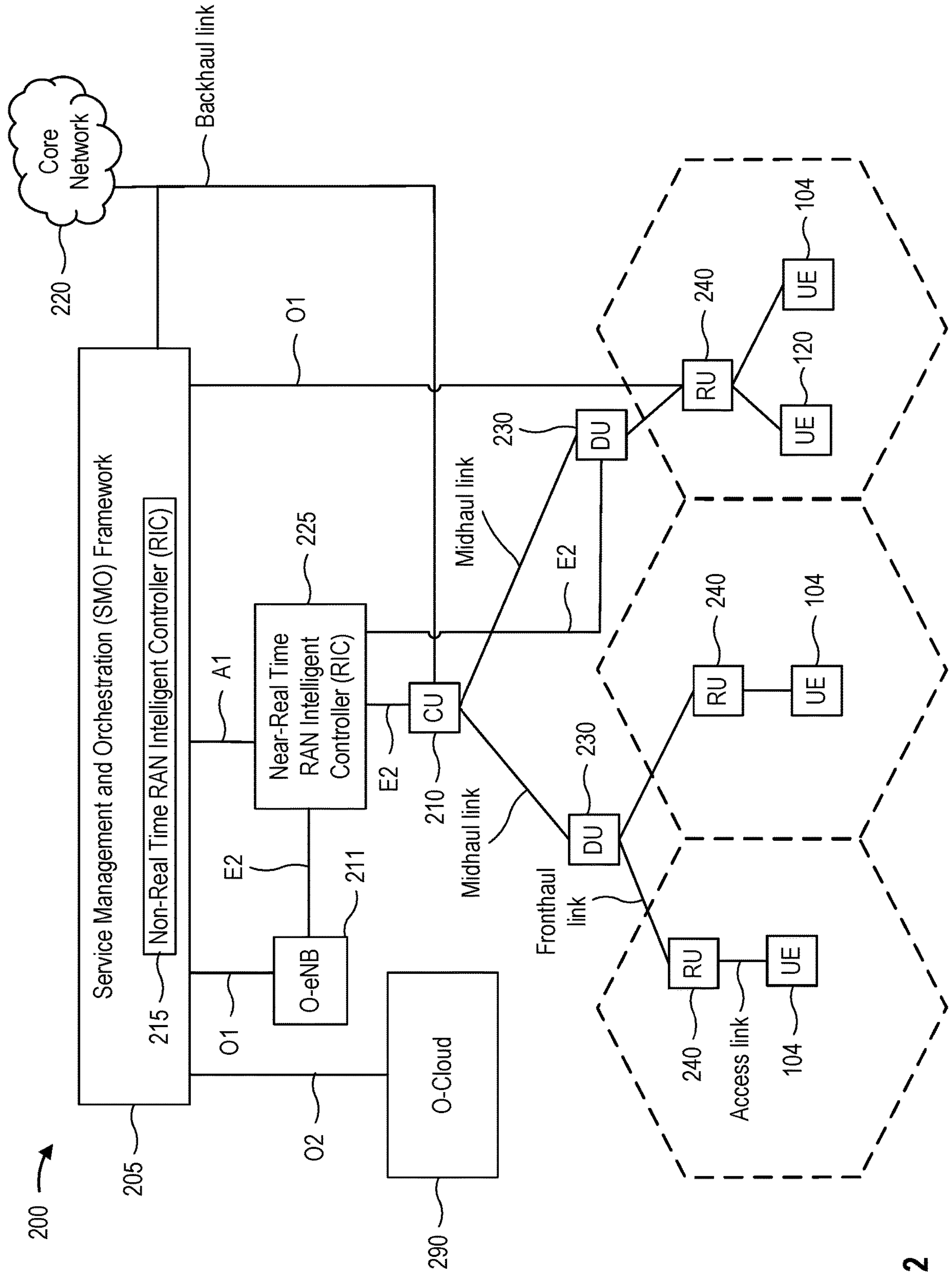
FIG. 2 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 110) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 110 within wireless communications network 100 may also be configured to support different radio access technologies, such as 3G, 4G, and/or 5G. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-52,600 MHz, which is sometimes referred to (interchangeably) as a “millimeter wave” (“mmW” or “mmWave”). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMES 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is the control node that processes the signaling between the UEs 120 and the EPC 160. Generally, MME 161 provides bearer and connection management.

Generally, user Internet protocol (IP) packets are transferred through Serving Gateway 163, which itself is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may be used to distribute MBMS traffic to the BSs 110 belonging to a Multicast Broadcast Single-frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, or a transmission reception point (TRP), to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units (e.g., the CUs 210, the DUs 230, the RUs 240, as well as the Near-RT RICs 225, the Non-RT RICs 215 and the SMO Framework 205) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over-the-air (OTA) communications with one or more UEs 120. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240, and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, artificial intelligence/machine learning (AI/ML) workflows including model training and updates, or policy-based guidance of applications/features in the Near-RT RIC 225. The Non-RT MC 215 may be coupled to or communicate with (such as via an A1 interface) the Near-RT MC 225. The Near-RT MC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT RIC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT MC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
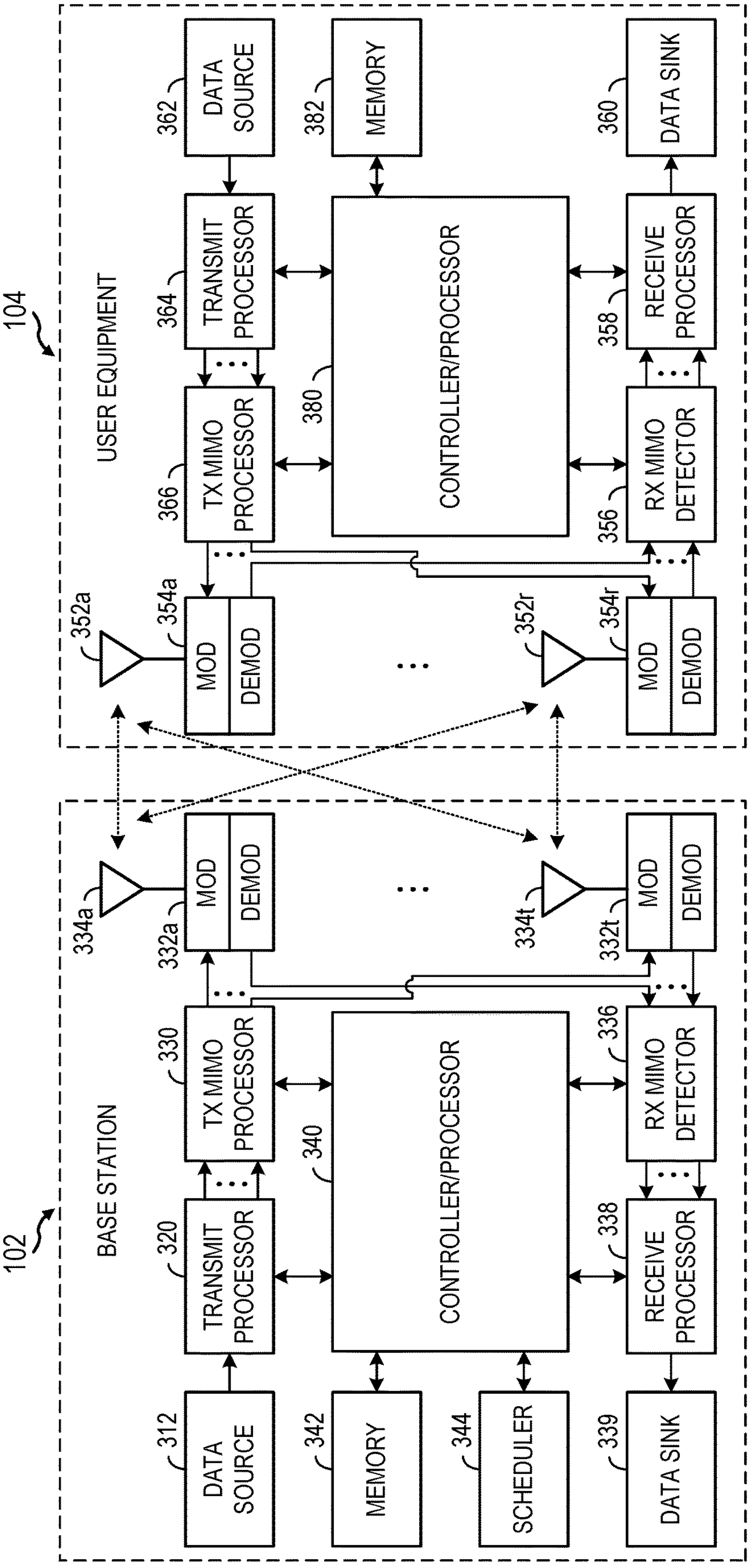
FIG. 3 depicts aspects of an example base station and an example user equipment.

FIG. 3 depicts aspects of an example BS 110 and UE 120.

Generally, BS 110 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 110 may send and receive data between BS 110 and UE 120. BS 110 includes controller/processor 340, which may be configured to implement various functions described herein related to wireless communications.

Generally, UE 120 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 120 includes controller/processor 380, which may be configured to implement various functions described herein related to wireless communications.

In regard to an example downlink transmission, BS 110 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARM) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 120 includes antennas 352*a*-352*r* that may receive the downlink signals from the BS 110 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 120 to a data sink 360, and provide decoded control information to a controller/processor 380.

In regard to an example uplink transmission, UE 120 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 110.

At BS 110, the uplink signals from UE 120 may be received by antennas 334*a-t*, processed by the demodulators in transceivers 332*a*-332*t*, detected by a MIMO detector 336 if applicable, and further processed by a receive processor 338 to obtain decoded data and control information sent by UE 120. Receive processor 338 may provide the decoded data to a data sink 339 and the decoded control information to the controller/processor 340. Memories 342 and 382 may store data and program codes for BS 110 and UE 120, respectively. Scheduler 344 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4B:
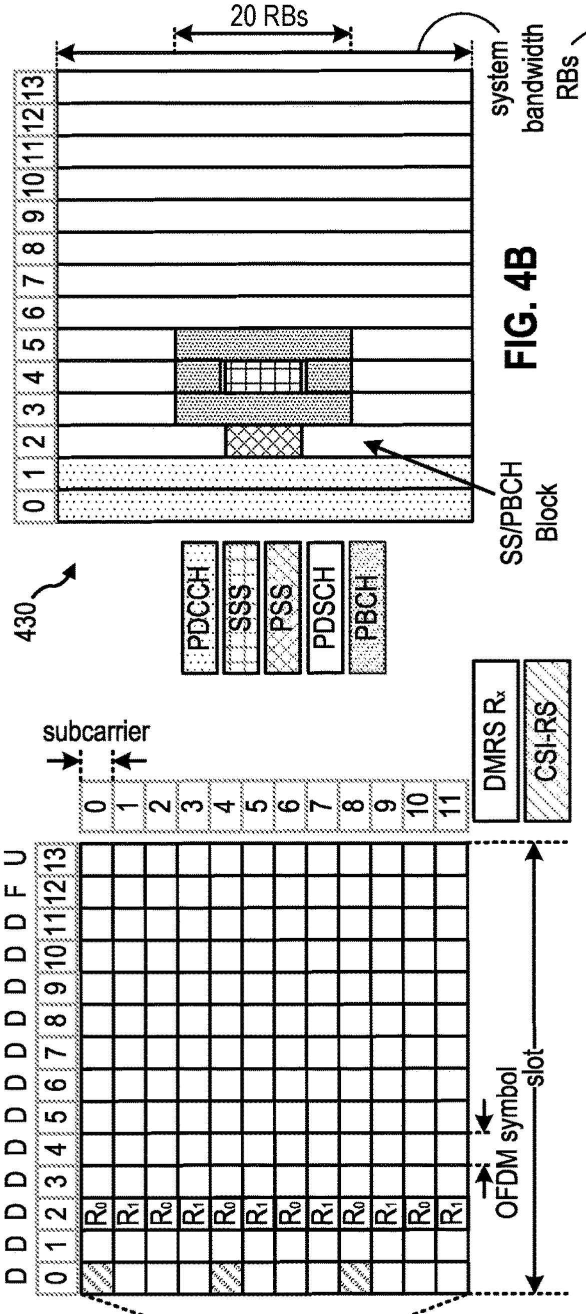
FIGS. 4A, 4B, 4C, and 4D depict various example aspects of data structures for a wireless communications network.
Figure 4A:
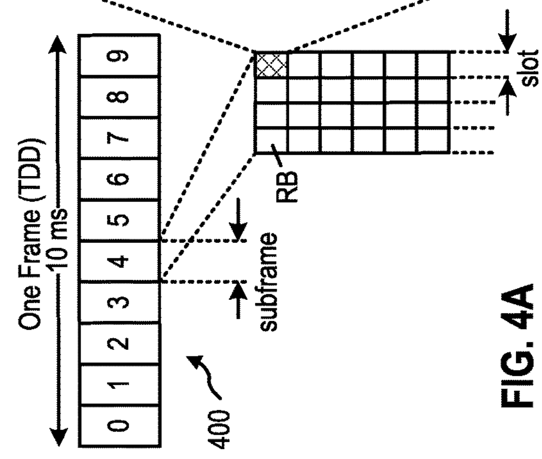
Figure 4D:
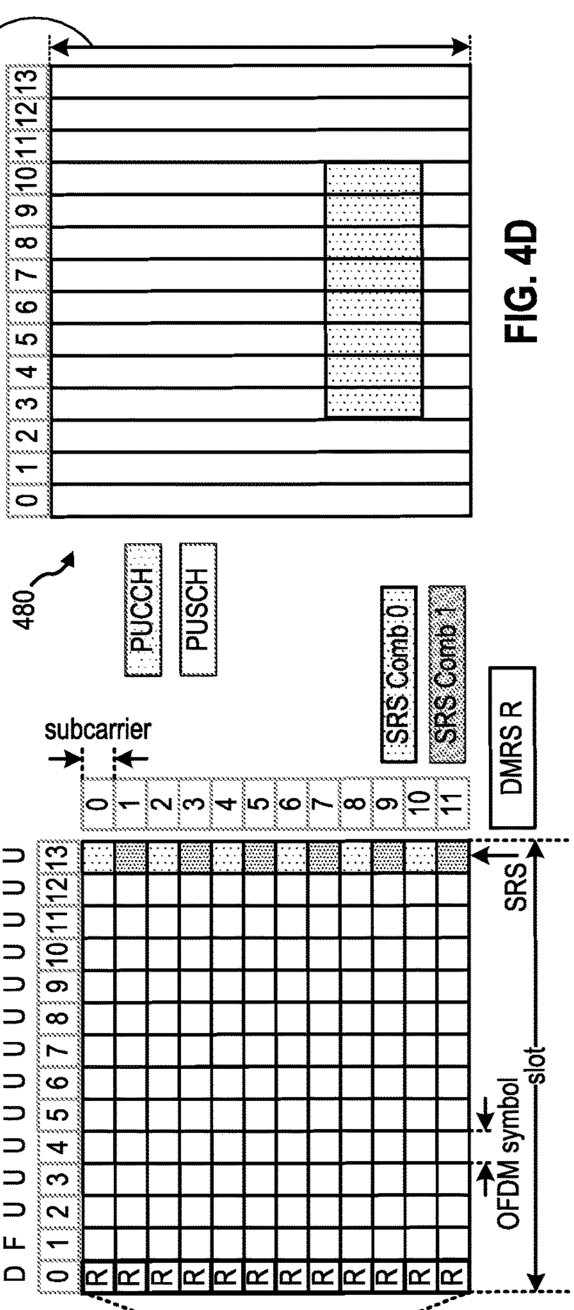
Figure 4C:
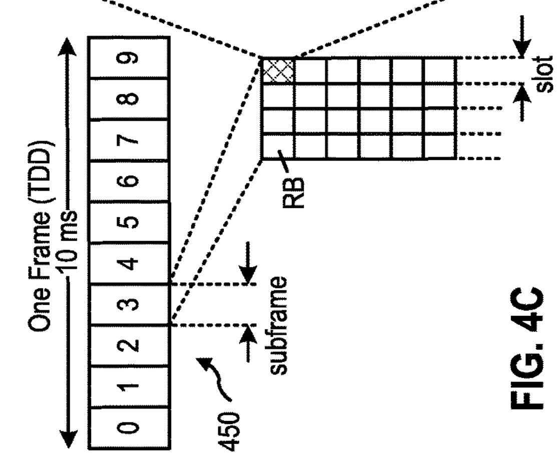

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}\times15$ kHz, where μ is the numerology 0 to 5. Accordingly, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120 of FIGS. 1 and 3). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
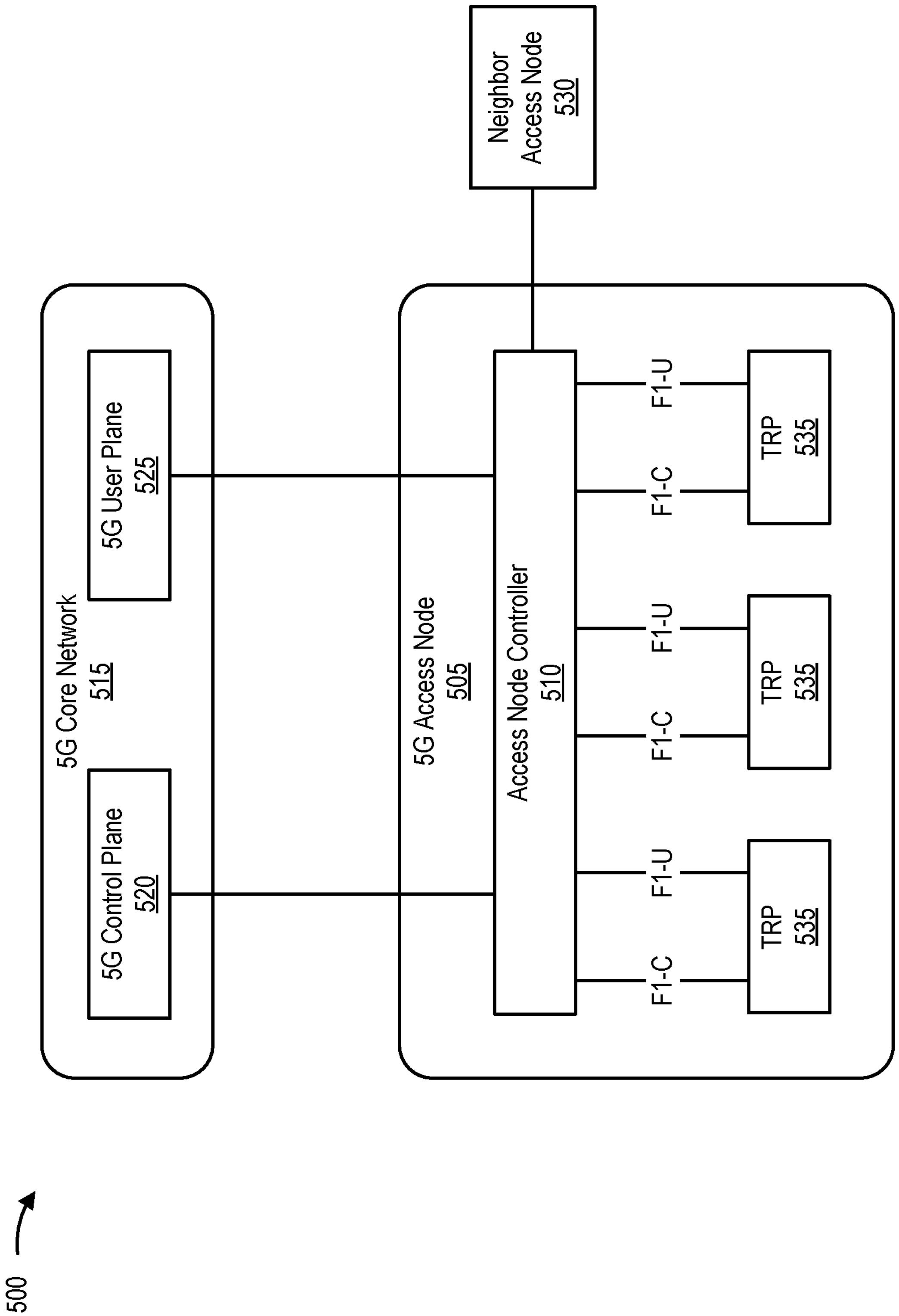
FIG. 5 illustrates an example logical architecture of a distributed radio access network (RAN).

Aspects Related to Switching a Single-Frequency Network (SFN) Physical Uplink Shared Channel (PUSCH) Communication Scheme FIG. 5 illustrates an example logical architecture of a distributed RAN 500.

A 5G access node 505 may include an access node controller 510. The access node controller 510 may be a central unit (CU) of the distributed RAN 500. In some aspects, a backhaul interface to a 5G core network 515 may terminate at the access node controller 510. The 5G core network 515 may include a 5G control plane component 520 and a 5G user plane component 525 (e.g., a 5G gateway), and the backhaul interface for one or both of the 5G control plane and the 5G user plane may terminate at the access node controller 510. Additionally, or alternatively, a backhaul interface to one or more neighbor access nodes 530

(e.g., another 5G access node 505 and/or an LTE access node) may terminate at the access node controller 510.

The access node controller 510 may include and/or may communicate with one or more TRPs 535 (e.g., via an F1 Control (F1-C) interface and/or an F1 User (F1-U) interface). A TRP 535 may be a distributed unit (DU) of the distributed RAN 500. In some aspects, a TRP 535 may correspond to a base station 110 described above in connection with FIG. 1. For example, different TRPs 535 may be included in different base stations 110. Additionally, or alternatively, multiple TRPs 535 may be included in a single base station 110. In some aspects, a base station 110 may include a CU (e.g., access node controller 510) and/or one or more DUs (e.g., one or more TRPs 535). In some cases, a TRP 535 may be referred to as a cell, a panel, an antenna array, or an array.

A TRP 535 may be connected to a single access node controller 510 or to multiple access node controllers 510. In some aspects, a dynamic configuration of split logical functions may be present within the architecture of distributed RAN 500. For example, a packet data convergence protocol (PDCP) layer, a radio link control (RLC) layer, and/or a medium access control (MAC) layer may be configured to terminate at the access node controller 510 or at a TRP 535.

In some aspects, multiple TRPs 535 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 535 may be configured to individually (e.g., using dynamic selection) or jointly (e.g., using joint transmission with one or more other TRPs 535) serve traffic to a UE 120.

As indicated above, FIG. 5 is provided as an example. Other examples may differ from what was described with regard to FIG. 5.

Figure 6:
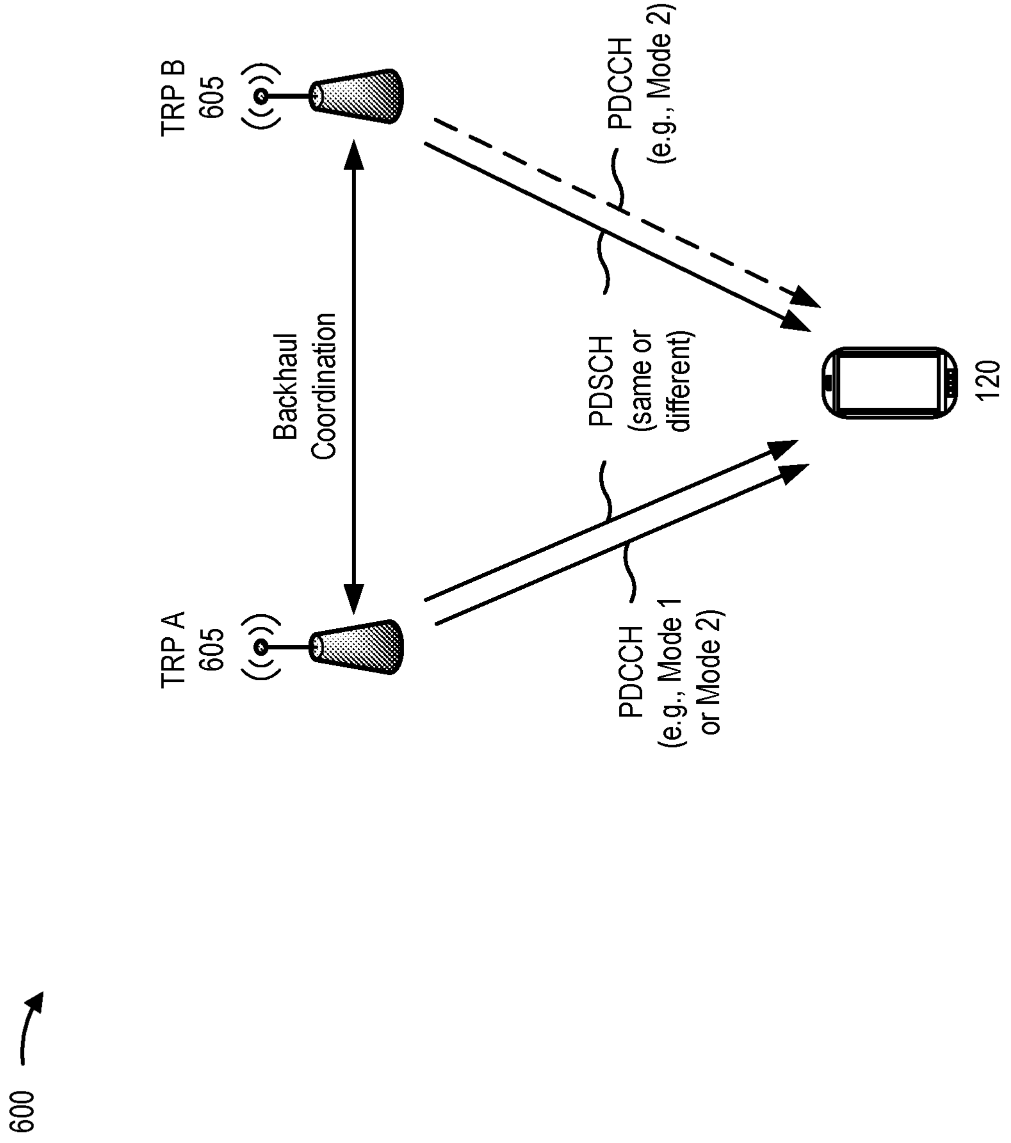
FIG. 6 is a diagram illustrating an example of multiple transmission reception point (TRP) communication.

FIG. 6 is a diagram illustrating an example 600 of multi-TRP communication (sometimes referred to as multi-panel communication). As shown in FIG. 6, multiple TRPs 605 may communicate with the same UE 120. A TRP 605 may correspond to a TRP 535 described above in connection with FIG. 5.

The multiple TRPs 605 (shown as TRP A and TRP B) may communicate with the same UE 120 in a coordinated manner (e.g., using coordinated multipoint transmissions) to improve reliability and/or increase throughput. The TRPs 605 may coordinate such communications via an interface between the TRPs 605 (e.g., a backhaul interface and/or an access node controller 510). The interface may have a smaller delay and/or higher capacity when the TRPs 605 are co-located at the same base station 110 (e.g., when the TRPs 605 are different antenna arrays or panels of the same base station 110), and may have a larger delay and/or lower capacity (as compared to co-location) when the TRPs 605 are located at different base stations 110. The different TRPs 605 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 605 (e.g., TRP A and TRP B) may transmit communications to the UE 120 on the same PDSCH. For example, a communication may be transmitted using a single codeword with different spatial layers for different TRPs 605 (e.g., where one codeword maps to a first set of layers transmitted by a first TRP 605 and maps to a second set of layers transmitted by a second TRP 605). As another example, a communication may be transmitted using multiple codewords, where different codewords are transmitted by different TRPs 605 (e.g., using different sets of layers). In either case, different TRPs 605 may use different QCL relationships (e.g., different TCI states) for different DMRS ports corresponding to different layers. For example, a first TRP 605 may use a first QCL relationship or a first TCI state for a first set of DMRS ports corresponding to a first set of layers, and a second TRP 605 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 605, and a second PDCCH may schedule a second codeword to be transmitted by a second TRP 605. Furthermore, first DCI (e.g., transmitted by the first TRP 605) may schedule a first PDSCH communication associated with a first set of DMRS ports with a first QCL relationship (e.g., indicated by a first TCI state) for the first TRP 605, and second DCI (e.g., transmitted by the second TRP 605) may schedule a second PDSCH communication associated with a second set of DMRS ports with a second QCL relationship (e.g., indicated by a second TCI state) for the second TRP 605. In this case, DCI (e.g., having DCI format 1_0 or DCI format 1_1) may indicate a corresponding TCI state for a TRP 605 corresponding to the DCI. The TCI field of a DCI indicates the corresponding TCI state (e.g., the TCI field of the first DCI indicates the first TCI state and the TCI field of the second DCI indicates the second TCI state).

A single PDCCH can be used to schedule uplink communications for a PUSCH. For example, the single PDCCH may carry DCI scheduling a PUSCH communication involving the transmission of multiple PUSCHs (carrying a transport block (TB) or a set of TBs) using a communication scheme, such as a TDM communication scheme, an FDM communication scheme, an SDM communication scheme, or an SFN communication scheme, among other communication schemes. The techniques described herein provide for switching (or indication) of communication schemes for a UE via the DCI, as described in connection with FIG. 9.

As indicated above, FIG. 6 is provided as an example. Other examples may differ from what is described with respect to FIG. 6.

Figure 7:
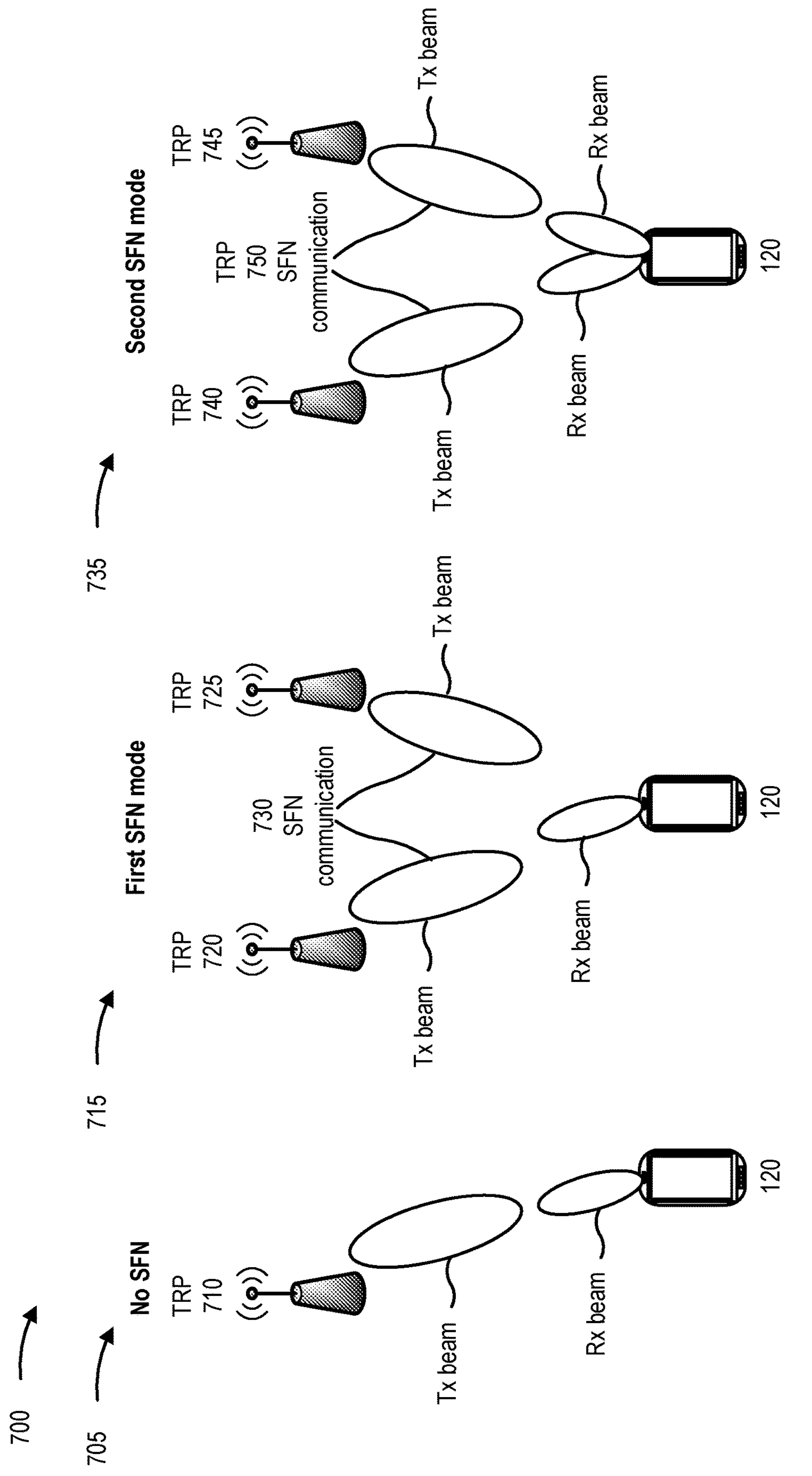
FIG. 7 is a diagram illustrating an example associated with single-frequency network (SFN) communication.

FIG. 7 is a diagram illustrating an example 700 associated with SFN communication.

In some cases, a UE may operate in an SFN. An SFN may be a network having a configuration in which multiple cells (e.g., multiple network entities or multiple cells associated with a single network entity) simultaneously transmit the same signal over the same frequency channel. As used herein, “SFN transmissions” may refer to two or more transmissions that are transmitted using the same (or substantially the same) time domain resources and frequency domain resources. For example, an SFN may be a broadcast network. An SFN may enable an extended coverage area without the use of additional frequencies. For example, an SFN configuration may include multiple network entities in an SFN area that transmit one or more identical signals using the same frequency at the same, or substantially the same, time. In some aspects, an SFN configuration may include other network devices, such as multiple TRPs corresponding to the same network entity. The multiple TRPs may provide coverage for an SFN area. The multiple TRPs may transmit one or more identical signals using the same frequency at the same, or substantially the same, time. In some examples, the identical signal(s) simultaneously transmitted by the multiple network entities (and/or multiple TRPs) may include a PDSCH signal, a control resource set (CORESET) scheduling the PDSCH, and/or a reference signal (e.g., a synchronization signal block, a CSI-RS, a tracking reference signal (TRS), or other reference signals), among other examples.

As shown by reference number 705, an example of communications that do not use an SFN configuration is depicted. A TRP 710 may transmit communications using a transmit (Tx) beam to the UE 120. The transmit beam may be associated with a TCI state. The UE 120 may receive communications (e.g., transmitted by the TRP 710) using a receive (Rx) beam. For example, the UE 120 may identify the TCI state associated with the transmit beam and may use information provided by the TCI state to receive the communications.

As shown by reference number 715, an example of a first SFN mode is depicted. As shown in FIG. 7, a first TRP 720 (or a first base station 110) and a second TRP 725 (or a second base station 110) may transmit an SFN communication 730 to the UE 120. For example, the first TRP 720 and the second TRP 725 may transmit substantially the same information (e.g., the SFN communication 730) to the UE 120 using the same frequency domain resources and the same time domain resources. The first TRP 720 may transmit the SFN communication 730 using a first transmit beam. The second TRP 725 may transmit the SFN communication 730 using a second transmit beam. In the first SFN mode, the UE 120 may be unaware that the SFN communication 730 is transmitted on separate transmit beams (e.g., from different TRPs and/or different base stations 110). Accordingly, when the multiple network entities (and/or multiple TRPs) simultaneously transmit the same signal to a UE 120, the SFN configuration may be transparent to the UE 120, and the UE 120 may aggregate, or accumulate, the simultaneous signal transmissions from the multiple TRPs (and/or multiple base stations 110), which may provide higher signal quality or higher tolerance for multipath attenuation, among other benefits. For example, the UE 120 may receive the SFN communication 730 using a single receive beam (e.g., may use a single spatial receive direction, among other examples, to receive the SFN communication 730). In other words, TCI states of the different transmit beams used to transmit the SFN communication 730 may not be signaled to the UE 120.

As shown by reference number 735, an example of a second SFN mode is depicted. As shown in FIG. 7, a first TRP 740 (or a first base station 110) and a second TRP 745 (or a second base station 110) may transmit an SFN communication 750 to the UE 120. For example, the first TRP 740 and the second TRP 745 may transmit substantially the same information (e.g., the SFN communication 750) to the UE 120 using the same frequency domain resources and the same time domain resources. The first TRP 740 may transmit the SFN communication 750 using a first transmit beam. The second TRP 745 may transmit the SFN communication 750 using a second transmit beam. In the second SFN mode, the UE 120 may be aware that the SFN communication 750 is transmitted on separate transmit beams (e.g., from different TRPs and/or different base stations 110). For example, a first TCI state of the first transmit beam (e.g., associated with the first TRP 740) and a second TCI state of the second transmit beam (e.g., associated with the second TRP 745) may be signaled to the UE 120. For example, a base station 110 may transmit configuration information (e.g., directly to the UE 120 or to the UE 120 via one or more network entities) that indicates that the SFN communication 750 may be a combination of transmissions from different TRPs and/or different transmit beams. The UE 120 may use the information associated with the different TRPs and/or different transmit beams (e.g., the first TCI state and the second TCI state) to improve a reception performance of the SFN communication 750. For example, as shown in FIG. 7, the UE 120 may use different spatial directions (e.g., different receive beams) to receive the SFN communication 750 based at least in part on the TCI states of the transmit beam(s) associated with the SFN communication 750. This may improve a performance of the UE 120 because the UE 120 may receive the SFN communication 750 from different transmit beams and/or different TRPs with improved signal strength and/or signal quality, among other examples.

As indicated above, FIG. 7 is provided as an example. Other examples may differ from what is described with respect to FIG. 7.

Figure 8:
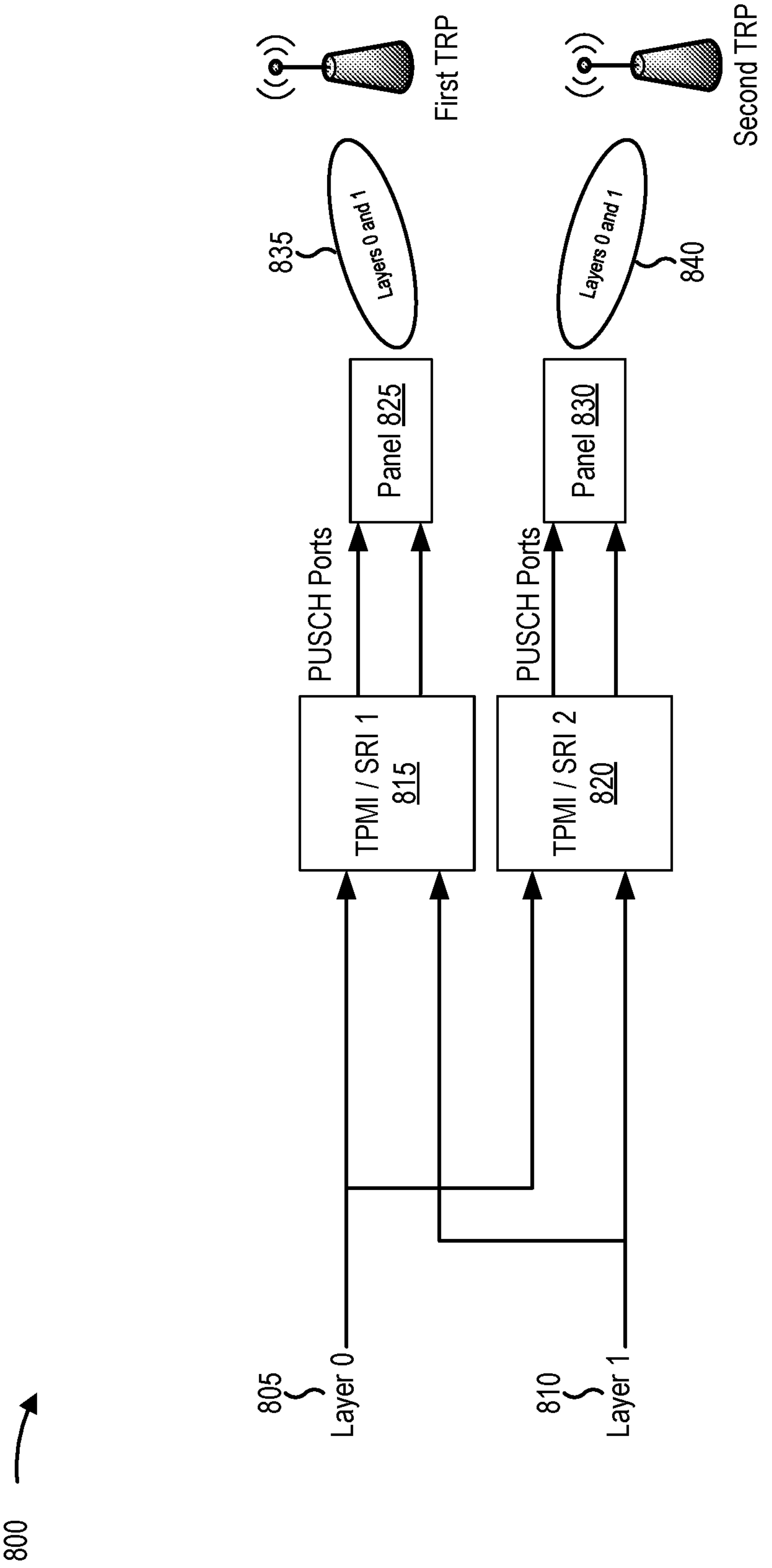
FIG. 8 is a diagram illustrating an example of an SFN communication scheme for transmission.

FIG. 8 is a diagram illustrating an example 800 of an SFN communication scheme for PUSCH transmission. Example 800 shows transmission components of a wireless communication device (e.g., UE 120), a first TRP (e.g., base station 110, TRP 605, TRP 535, TRP 720, TRP 725), and a second TRP (e.g., base station 110, TRP 535, TRP 605, TRP 720, TRP 725). In some aspects, the first TRP and the second TRP may be associated with a gNB (e.g., base station 110).

Example 800 relates to PUSCH transmission. In some examples, example 800 may be implemented in an SFN, though the techniques described herein are not limited to those involving SFNs. A PUSCH is a physical channel used, for example, to transfer end-user application data and signaling radio bearer (SRB) messages. A transmission of data using the PUSCH is referred to herein as a PUSCH communication. For example, a UE may transmit a PUSCH communication using the PUSCH.

A PUSCH transmission can be a codebook based (CB) transmission or a non-CB (NCB) transmission, among other examples. In CB transmission, a UE may be configured with only one SRS resource set, and a “usage” parameter of the SRS resource set may be set to “codebook.” A maximum of 4 SRS resources within the SRS resource set may be configured for the UE. An SRS resource indicator (SRI) field in uplink DCI (that is, DCI scheduling the PUSCH transmission) may indicate one SRS resource. A number of layers (that is, a rank) and a transmitted precoding matrix indicator (TPMI) (sometimes referred to as a precoder) for the scheduled PUSCH may be determined from a separate DCI field indicating precoding information and a number of layers.

For NCB transmission, a UE may be configured with only one SRS resource set with a "usage" parameter set to "noncodebook." The UE may be configured with a maximum of 4 SRS resources within the SRS resource set. Each SRS resource may have one port. An SRI field in uplink DCI scheduling a PUSCH transmission may indicate one or multiple SRS resources. The number of indicated SRS resources determines the rank (that is, the number of layers) for the scheduled PUSCH. The PUSCH is transmitted with the same precoder as the indicated SRS resources.

In some examples, PUSCH transmission may use repetition. For example, a single DCI message may schedule multiple sets of PUSCH repetitions in a TDM manner (referred to herein as a TDM communication scheme). A PUSCH repetition may be transmitted on a PUSCH transmission occasion. Thus, a reference to a PUSCH transmission occasion, in the context of PUSCH repetition, may refer to a PUSCH repetition transmission on the PUSCH transmission occasion. A set of PUSCH repetitions can include one or more PUSCH repetitions. Each set of PUSCH repetitions, scheduled by the single DCI message, may have different transmission parameters (such as a beam, spatial relation, or transmission configuration indicator (TCI) state; a power control parameter; or a precoder). For example, a first set of PUSCH repetitions scheduled by a single DCI message may belong to a first set associated with first transmission parameters and a second set of PUSCH repetitions scheduled by the single DCI message may belong to a second set associated with second transmission parameters. Each set of PUSCH repetitions may be associated with (e.g., may carry) the same transport block. The first set may correspond to a first SRS resource set, and the second set may correspond to a second SRS resource set. The DCI message may indicate two sets of transmission parameters (e.g., indicating two beams, two sets of power control parameters, or the like) using a first SRI field for the first set of transmission parameters and a second SRI field for the second set of transmission parameters. For example, the DCI message may indicate the two sets of transmission parameters using two SRI fields for both CB transmission and NCB transmission. For CB transmission, the DCI message may include two TPMI fields indicating two precoders for two sets of PUSCH repetitions.

In the TDM communication scheme, a UE can dynamically switch between a multi-TRP (mTRP) mode in which the UE communicates with multiple TRPs, and a single-TRP (sTRP) mode in which the UE communicates with a single TRP. The dynamic switching may be implemented using DCI signaling. This may be based on a field in a DCI format (e.g., DCI formats 0_1 and 0_2), referred to herein as an SRS resource set indicator. The presence of the SRS resource set indicator field in a DCI format may be based on whether two SRS resource sets are configured corresponding to the DCI format. In this context, the SRS resource set indicator field may have 2 bits. A value of the 2 bits (referred to herein as a codepoint) may indicate whether a PUSCH is to be transmitted in an mTRP mode, an SRS resource set to be used for the PUSCH, and an order of PUSCH repetitions scheduled by a DCI message using the DCI format. For example, a first value of the SRS resource set indicator field may indicate that a first repetition is to be directed to a first TRP and a second repetition is to be directed to a second TRP, and a second value of the SRS resource set indicator field may indicate that a first repetition is to be directed to the second TRP and the second repetition is to be directed to the first TRP. An example set of codepoints and corresponding transmission parameters is provided in Table 1, below:

TABLE 1

| Codepoint | SRS resource set(s) | SRI (for both CB and NCB)/TPMI (CB only) field(s) |
|---|---|---|
| 00 | sTRP mode with 1st SRS resource set (TRP1) | 1st SRI/TPMI field (2nd field is unused) |
| 01 | sTRP mode with 2nd SRS resource set (TRP2) | 1st SRI/TPMI field (2nd field is unused) |
| 10 | mTRP mode with (TRP1, TRP2 order)<br>1st SRI/TPMI field: 1st SRS resource set<br>2nd SRI/TPMI field: 2nd SRS resource set | Both 1st and 2nd SRI/TPMI fields |
| 11 | mTRP mode with (TRP2, TRP1 order)<br>1st SRI/TPMI field: 1st SRS resource set<br>2nd SRI/TPMI field: 2nd SRS resource set | Both 1st and 2nd SRI/TPMI fields |

In some aspects, a PUSCH communication can be transmitted using an FDM communication scheme. In one example of an FDM communication scheme, two PUSCH transmission occasions with the same or different redundancy versions (RVs) of the same TB are transmitted from different UE antenna groups on non-overlapped frequency domain resources and the same time domain resources. In another example of an FDM communication scheme, different parts of the frequency domain resource of one PUSCH transmission occasion are transmitted from different UE antenna groups.

In some aspects, a PUSCH communication can be transmitted using an SDM scheme. In an SDM scheme, different layers (e.g., different demodulation reference signal (DMRS) ports) of a PUSCH are separately precoded and transmitted from different antenna groups of the UE simultaneously.

In some aspects, a PUSCH communication can be transmitted using an SDM repetition scheme (referred to herein as an SDM communication scheme). In the SDM communication scheme, two PUSCH transmission occasions with different RVs of the same TB are transmitted from two different UE antenna groups simultaneously.

Example 800 is an example of an SFN communication scheme using a single-DCI based SFN PUSCH. An SFN communication scheme may provide for SFN-based transmission of a PUSCH communication. In an SFN communication scheme, all layers (e.g., DMRS ports) of a PUSCH transmission are transmitted using multiple antenna modules of the UE simultaneously. An antenna module (sometimes referred to as an antenna panel) may include a group of one or more antennas that can be configured to transmit a communication using a beam. A transmission using an antenna module may be transmitted via a group of one or more antennas of the antenna module. A single DCI may schedule a PUSCH communication. Each layer of the PUSCH communication is transmitted using multiple antenna modules. Each antenna module, of the multiple antenna modules, may use a different set of transmission parameters (e.g., transmit beam, precoder, power control parameter, a combination thereof, or another transmission parameter) to transmit the PUSCH communication.

For example, a UE may receive DCI scheduling transmission of a PUSCH communication. The DCI may include an SRS resource set indicator field, two SRI fields, and two TPMI fields. The PUSCH communication may include a first layer (Layer 0, shown by reference number 805) corresponding to a first DMRS port and a second layer (Layer 1, shown by reference number 810) corresponding to a second DMRS port. Each layer (e.g., DMRS port) of the PUSCH communication may be associated with two SRS resource sets. As shown, each layer of the PUSCH communication is mapped to a first antenna module 825 through (e.g., using) a first TPMI and SRI (shown by reference number 815) and a second antenna module 830 through (e.g., using) a second TPMI and SRI (shown by reference number 820).

As shown by reference number 835, the first antenna module 825 may transmit the PUSCH communication including the first layer and the second layer (e.g., to a first TRP). As shown by reference number 840, the second antenna module 830 may transmit the PUSCH communication including the first layer and the second layer. For example, the first antenna module 825 and the second antenna module 830 may simultaneously transmit all layers of the PUSCH communication. The first antenna module 825 may generate a first transmit beam associated with a first TCI state and a first SRS resource set, and the second antenna module 830 may generate a second transmit beam associated with a second TCI state and a second SRS resource set. Thus, the UE may use an SFN transmission scheme to transmit the PUSCH communication using multiple antenna modules including the first antenna module 825 and the second antenna module 830.

As noted above, PUSCH repetitions transmitted using the FDM communication scheme, the SDM communication scheme, and the TDM communication scheme may be associated with an order. The order may indicate whether a communication on a first PUSCH transmission occasion (or set of PUSCH transmission occasions) is to be transmitted to a first TRP or a second TRP. Therefore, when switching between communication schemes associated with an order, signaling indicating to switch the communication scheme may indicate the order. For a TDM communication scheme, the order may indicate whether a first PUSCH transmission occasion in time is associated with a first SRS resource set or a second SRS resource set. For an SDM communication scheme, the order may indicate whether a first set of layers of a PUSCH communication are associated with the first SRS resource set or the second SRS resource set. For an FDM communication scheme, the order may indicate whether a first set of RBs of the PUSCH communication is associated with the first SRS resource set or the second SRS resource set.

However, an SFN communication scheme may not be associated with an order (e.g., order switching may not be meaningful for an SFN communication scheme). This is because each DMRS port (e.g., layer) of the PUSCH communication, across all time and frequency resources of the PUSCH transmission, is associated with both SRS resource sets and both TCI states, so the order of first and second SRS resource sets and TCI states does not matter (since each layer is simultaneously transmitted using both SRS resource sets and both TCI states). Therefore, a DCI format used for switching SDM, TDM, and FDM communication schemes, which may include a bit indicating an order for a communication scheme, may involve unnecessary overhead for the SFN communication scheme.

Some techniques and apparatuses described herein provide an indication of whether to transmit a PUSCH communication using an SFN communication scheme. In some aspects, the indication may include a single codepoint indicating an SFN communication scheme, as compared to two codepoints corresponding to different orders of a communication scheme. Thus, overhead is reduced relative to indication of other communication schemes.

As indicated above, FIG. 8 is provided as an example. Other examples may differ from what is described with regard to FIG. 8.

Figure 9:
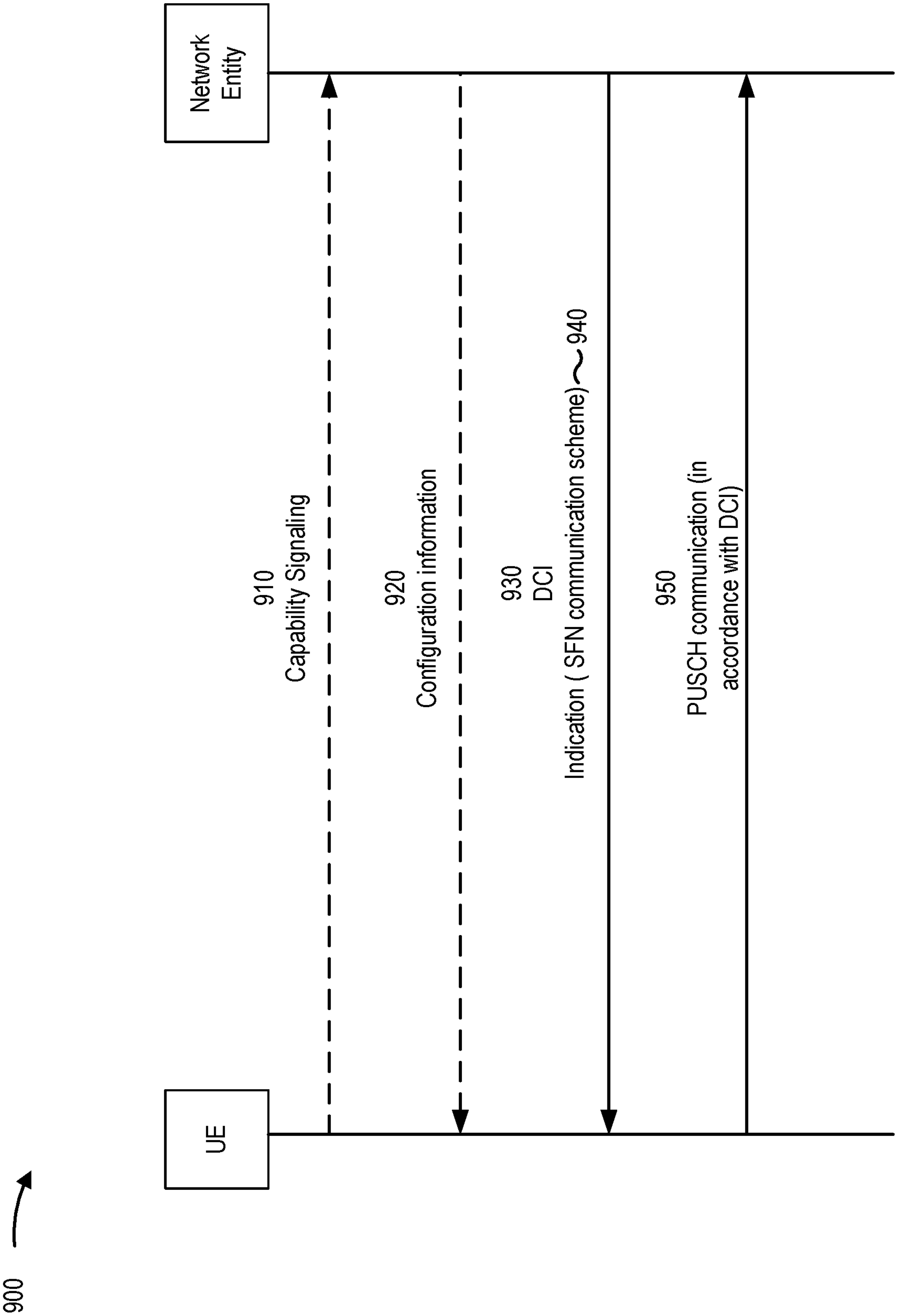
FIG. 9 is a diagram illustrating an example of signaling associated with switching for an SFN communication scheme.

FIG. 9 is a diagram illustrating an example 900 of signaling associated with switching for an SFN communication scheme. As shown, example 900 includes a network entity and a UE (e.g., UE 120). The network entity may include, for example, base station 110 or one or more disaggregated network entities. In some aspects, the network entity may be associated with multiple TRPs (not illustrated in FIG. 9), such as TRP 535, TRP 605, TRP 720, or TRP 725.

As shown in FIG. 9, and by reference number 910, the UE may optionally transmit capability signaling. For example, the UE may transmit capability information. The capability signaling may indicate whether the UE supports the SFN communication scheme. For example, the capability signaling may include a first value indicating that the UE supports the SFN communication scheme (e.g., that the UE can transmit a PUSCH communication using the SFN communication scheme) or a second value indicating that the UE does not support the SFN communication scheme.

In some aspects, the capability signaling may be specific to a band. For example, the capability signaling may indicate whether the UE supports the SFN communication scheme for PUSCH communications on a particular band. As another example, the capability signaling may identify a plurality of bands, and may indicate, for each band of the plurality of bands, whether the UE supports the SFN communication scheme on each band.

In some aspects, the capability signaling may be specific to a UE. For example, the capability signaling may identify the UE, and may indicate whether the UE supports the SFN communication scheme.

In some aspects, the capability signaling may be specific to a band combination. For example, the capability signaling may indicate, for a band combination (e.g., a dual connectivity band combination including at least a first band and a second band), whether the UE supports the SFN communication scheme. As another example, the capability signaling may identify a plurality of band combinations, and may indicate, for each band combination of the plurality of band combinations, whether the UE supports the SFN communication scheme on each band combination.

In some aspects, the capability signaling may be specific to a feature set. A feature set stores a set of UE capabilities and features. The feature set may be linked to one or more bands within a band combination, or to one or more band combinations. For example, the capability signaling may identify a feature set indicating whether the UE supports the SFN communication scheme, and may link the feature set to each band and band combination for which the UE supports the SFN communication scheme. Thus, the capability signaling may identify, per band and per band combination, whether the UE supports the SFN communication scheme.

As shown by reference number 920, the network entity may optionally output configuration information. For example, the network entity may output configuration information, such as RRC configuration information, for transmission by a TRP or the like. As another example, the network entity may transmit the configuration information. In some aspects, the network entity may output the configuration information based on the capability signaling described with regard to reference number 910. In some aspects, the configuration information may be based at least in part on the capability signaling. For example, the network entity may determine the configuration information based on whether the capability signaling indicates that the UE supports the SFN communication scheme. As another example, the network entity may output configuration information configuring an SFN communication scheme (e.g., for a particular band, a band combination, a UE, or a band and band combination) based on the capability signaling indicating that the UE supports the SFN communication scheme.

In some aspects, the configuration information may configure multiple SRS resource sets. For example, the configuration information may configure two SRS resource sets with usage parameters set to "codebook" or "noncodebook". Additionally, the configuration information may configure an SFN communication scheme. For example, the configuration information may indicate that activation of, or switching to, the SFN communication scheme via DCI (as described in connection with reference number 930). As another example, the configuration information may indicate a set of parameters for the SFN communication scheme. For example, the configuration information may indicate how values of an indication provided via the DCI should be interpreted (such as in Tables 2, 3, and/or 4 below).

In some aspects, the configuration information may be specific to a bandwidth part (BWP) or component carrier (CC). For example, the configuration information may be specific to a BWP and/or a CC for a dynamic grant PUSCH (that is, a PUSCH for which resources are scheduled via a dynamic grant). A CC is a bandwidth on which a UE can communicate with the network entity. A BWP is a configured set of frequency resources, within a CC, that can be used by a UE for communication. A BWP can be configured with a set of configuration parameters, and can be activated or deactivated, for a UE, via network signaling. A UE may transmit and receive communications of the UE within an active BWP. The configuration information may configure multiple SRS resource sets, and/or the SFN communication scheme, for a particular BWP or group of BWPs.

In some aspects, the configuration information may be specific to a configured grant. For example, the configuration information may be included in a configuration of a configured grant (CG) associated with a PUSCH (e.g., a CG-PUSCH). The configuration information may configure multiple SRS resource sets, and/or the SFN communication scheme, for a particular CG or a set of CGs.

In some aspects, the configuration information may be specific to a DCI format. For example, the configuration may be separately configured (e.g., via different RRC messages or different RRC information elements) for a DCI format 0_1 and for a DCI format 0_2, such as for a DG-PUSCH.

In some aspects, the configuration information may configure multiple communication schemes. For example, the configuration information may configure two or more of an SFN communication scheme, a TDM communication scheme, an SDM communication scheme, an FDM communication scheme, or an sTRP communication scheme. If more than one communication scheme is configured by the configuration information, the indication described below in connection with reference number 940 may indicate which communication scheme is to be used for a PUSCH scheduled by the DCI described below in connection with reference number 930.

As shown in FIG. 9, and by reference number 930, the network entity may output DCI. The UE may receive the DCI. In some aspects, the network entity may transmit the DCI. In some other aspects, the network entity may provide the DCI for transmission (e.g., by a first TRP and/or a second TRP associated with the network entity).

As shown by reference number 940, the DCI may include an indication. In some aspects, the indication indicates a communication scheme for transmitting a PUSCH communication. For example, the communication scheme may be one of a TDM communication scheme, an FDM communication scheme, an SDM communication scheme, an SFN communication scheme, or an sTRP communication scheme. In some aspects, the indication may comprise a field of the DCI. For example, the indication may be a value (e.g., codepoint) of the field of the DCI.

In some aspects, the indication may indicate whether a scheduled PUSCH communication (scheduled by the DCI) should be transmitted using an SFN communication scheme or not. In some aspects, the DCI may not provide for dynamic switching between an SFN communication scheme and other communication schemes in which the scheduled PUSCH transmission is associated with two SRS resource sets (e.g., a TDM communication scheme, an SDM communication scheme, or an FDM communication scheme), which reduces a size of the indication relative to an indication that indicates a switching arrangement for a communication scheme in which the scheduled PUSCH transmission is associated with two SRS resource sets. In this case, the indication may indicate whether the PUSCH communication is to be transmitted using a first SRS resource set using a first antenna module of the UE's multiple antenna modules, a second SRS resource set using a second antenna module of the multiple antenna modules, or both the first SRS resource set and the second SRS resource set using the first antenna module and the second module (that is, an SFN communication scheme).

In some aspects, the indication (e.g., the SRS resource set indicator field) may include 2 bits. Thus, the indication can indicate 4 values (e.g., 4 codepoints): 00, 01, 10, and 11. In some aspects, a first value of the indication may indicate the PUSCH communication is to be transmitted using a first SRS resource set using a first antenna module, a second value may indicate the PUSCH communication is to be transmitted using a second SRS resource set using a second antenna module, and a third value may indicate the PUSCH communication is to be transmitted using both the first SRS resource set and the second SRS resource set using the first antenna module and the second module.

In some aspects, a fourth value of the indication may be reserved. For example, the UE may not expect the indication to be set to (e.g., include) the fourth value. In some aspects, a fourth value of the indication may indicate the same behavior as the third value of the indication. For example, the fourth value may indicate the PUSCH communication is to be transmitted using both the first SRS resource set and the second SRS resource set using the first antenna module and the second module using the same transmission parameters as the third value (e.g., the fourth value may also indicate to use the SFN communication scheme). In some aspects, a fourth value of the indication may indicate to use the SFN communication scheme with a different set of transmission parameters than the third value. For example, the third value may indicate that a first set of transmission parameters is to be used for the transmission of the PUSCH communication simultaneously using the multiple antenna modules, or the fourth value may indicate that a second set of transmission parameters is to be used for transmission of the PUSCH communication simultaneously using the multiple antenna modules. In such examples, the fourth value may indicate to interpret one or more DCI fields (such as a transmit power control (TPC) field, a phase tracking reference signal (PTRS)-DMRS association field, or an open loop power control parameter set indication field) of the DCI differently than the third value. For example, if the DCI includes one TPC field, the third value (for example, 10) may indicate that a TPC command indicated by the TPC field is applied to both closed loop adjustment states (e.g., for both antenna modules of the multiple antenna modules), while the fourth value (for example, 11) may indicate that the TPC command is applied only to the first closed loop adjustment state. As another example, if the DCI includes one TPC field, the third value may indicate that the TPC command is applied only to the first closed loop adjustment state, while the fourth value may indicate that the TPC command is applied only to the second closed loop adjustment state. An example of values of the indication, SRS resource sets indicated by the values, and communication schemes indicated by the values, is provided in Table 2, below:

TABLE 2

| Codepoint/value | SRS resource set(s) |
| --- | --- |
| 0 (00) | sTRP communication scheme with 1st SRS resource set (TRP1) |
| 1 (01) | sTRP communication scheme with 2nd SRS resource set (TRP2) |
| 2 (10) | SFN communication scheme<br>1st SRI/TPMI field:<br>1st SRS resource set<br>2nd SRI/TPMI field:<br>2nd SRS resource set |
| 3 (11) | Option 1: Reserved<br>Option 2: SFN communication scheme, same behavior as 2 (10)<br>Option 3: SFN communication scheme, not the same behavior as 2 (10) |

In some aspects, the indication (e.g., the SRS resource set indicator field) may include 1 bit. Thus, the indication can indicate 2 values (e.g., 2 codepoints): 0 and 1. In some aspects, a first value of the indication indicates that the PUSCH communication is to be transmitted using a first SRS resource set using a first antenna module (e.g., a single antenna module), or a second value of the indication indicates that the PUSCH communication is to be transmitted using the first SRS resource set and a second SRS resource set using the multiple antenna modules of the UE (e.g., using an SFN communication scheme). For example, the second value may indicate the SFN communication scheme, and the first value may indicate a fixed one of two SRS resource sets. An example is provided in Table 3, below:

TABLE 3

| Codepoint | SRS resource set(s) |
| --- | --- |
| 0 | sTRP communication scheme with 1st SRS resource set (TRP1) |
| 1 | SFN communication scheme<br>1st SRI/TPMI field:<br>1st SRS resource set<br>2nd SRI/TPMI field:<br>2nd SRS resource set |

In some aspects, the indication (e.g., the SRS resource set indicator field) may provide for switching of a communication scheme between the SFN communication scheme and one or more communication schemes in which the PUSCH is associated with two SRS resource sets (such as a TDM communication scheme, an SDM communication scheme, or an FDM communication scheme). For example, the indication may indicate a particular communication scheme for transmitting the PUSCH communication, wherein the particular communication scheme is one of the SFN communication scheme, a TDM communication scheme, an SDM communication scheme, an FDM communication scheme, or an sTRP communication scheme. In some aspects, the indication may indicate a switching arrangement associated with the particular communication scheme. For example, if the particular communication scheme can be associated with a first switching arrangement or a second switching arrangement (such as a TDM communication scheme, an SDM communication scheme, or an FDM communication scheme), the indication may indicate whether the particular communication scheme is associated with the first switching arrangement or the second switching arrangement. For example, the indication may select between a PUSCH communication associated with a first SRS resource set, a PUSCH communication associated with the second SRS resource set, one or more of a TDM, SDM, or FDM communication scheme associated with both SRS resource sets and with the first SRS resource set applied first (that is, a first switching arrangement), one or more of the TDM, SDM, or FDM communication scheme associated with both SRS resource sets with the second SRS resource set applied first (that is, a second switching arrangement), or the SFN communication scheme associated with both SRS resource sets.

In some aspects, the SFN communication scheme is associated with a single value (e.g., codepoint) of the indication. If there are additional values (other than values used to indicate a TDM communication scheme, an FDM communication scheme, an SDM communication scheme, or another communication scheme other than an SFN communication scheme), these additional values may be reserved. In some aspects, a single value may be assigned to an sTRP communication scheme, which may reduce a size of the indication. In some aspects, a single value may be assigned to a communication scheme in which the PUSCH is associated with two SRS resource sets (such as a TDM communication scheme, an SDM communication scheme, or an FDM communication scheme), which may reduce a size of the indication. In such examples, the single value may correspond to a single switching arrangement for the communication scheme (e.g., switching of the switching arrangement may not be enabled for the communication scheme associated with the single value).

In some aspects, the SFN communication scheme is associated with multiple values (e.g., codepoints) of the indication. The multiple values may each indicate the SFN communication scheme and the same transmission parameters for the SFN communication scheme. In some other aspects, a first value, associated with the SFN communication scheme, may indicate a first set of transmission parameters for the SFN communication scheme, and a second value, associated with the SFN communication scheme, may indicate a second set of transmission parameters (different than the first set of transmission parameters) for the SFN communication scheme. For example, the second value may indicate a different interpretation of one or more DCI fields (e.g., a transmit power control field, a PTRS-DMRS association field, or an open loop power control parameter set indication field of the DCI of reference number 930).

Example values of the indication providing for switching of a communication scheme between the SFN communication scheme, and one or more communication schemes in which the PUSCH is associated with two SRS resource sets, are provided in Table 4, below:

TABLE 4

| Codepoint | SRS resource set(s) |
|---|---|
| 0 (000) | sTRP communication scheme with 1st SRS resource set (TRP1) |
| 1 (001) | sTRP communication scheme with 2nd SRS resource set (TRP2) |
| 2 (010) | TDM communication scheme (first repetition is associated with the first SRS resource set)<br>1st SRI/TPMI field:<br>1st SRS resource set<br>2nd SRI/TPMI field:<br>2nd SRS resource set |
| 3 (011) | TDM communication scheme (first repetition is associated with the second SRS resource set)<br>1st SRI/TPMI field:<br>1st SRS resource set<br>2nd SRI/TPMI field:<br>2nd SRS resource set |
| . . . | . . . |
| 7 (110) | SFN communication scheme<br>1st SRI/TPMI field:<br>1st SRS resource set<br>2nd SRI/TPMI field:<br>2nd SRS resource set |
| 8 (111) | Option 1: Reserved<br>Option 2: SFN communication scheme, Same behavior as 7 (110)<br>Option 3: SFN communication scheme, not the same behavior as 7 (110) |

As shown by reference number 950, the UE may transmit a PUSCH communication in accordance with the DCI. For example, the UE may transmit the PUSCH communication using a particular communication scheme indicated by the indication shown by reference number 940. In some aspects, the UE may transmit the PUSCH communication using the SFN communication scheme. For example, the UE may transmit the PUSCH communication with all layers (e.g., DMRS ports) of the PUSCH communication transmitted using each of multiple antenna modules of the UE. In this way, the UE can be dynamically switched to the SFN communication scheme using DCI. In some examples, an indication of the DCI does not include an indication of a switching arrangement for a communication scheme, which reduces the size of the indication. In some examples, the DCI can indicate communication schemes, other that the SFN communication scheme, associated with multiple SRS resource sets, which improves flexibility of PUSCH transmission of the UE.

Example Operations of a User Equipment

Figure 10:
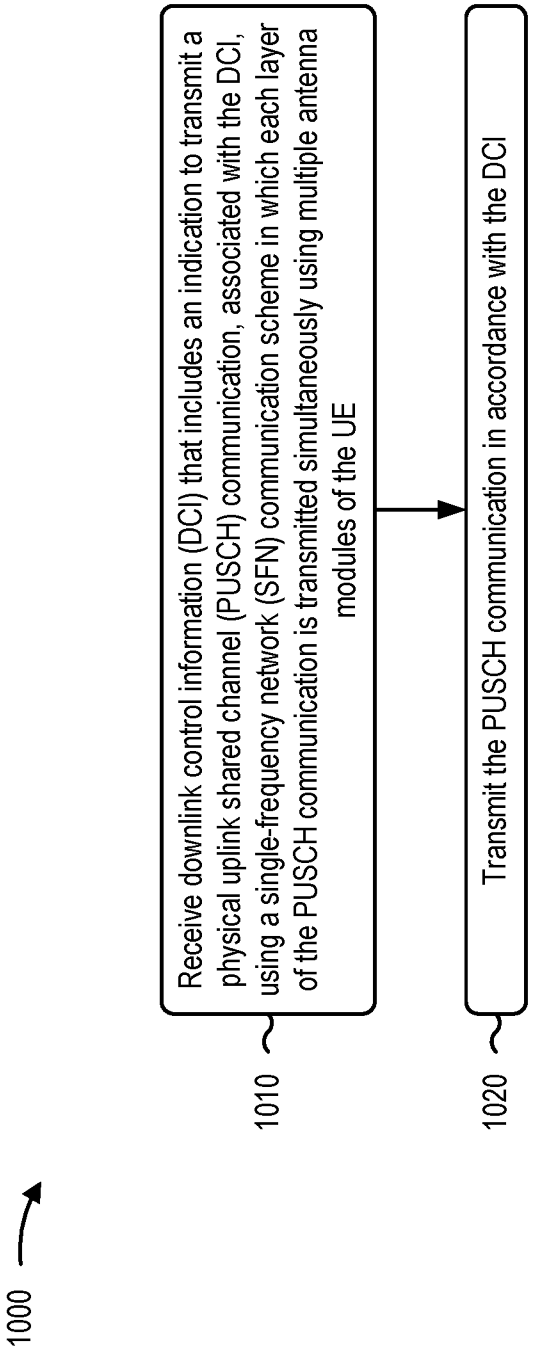
FIG. 10 depicts a method for wireless communications.

FIG. 10 shows a method 1000 for wireless communications by a UE, such as UE 120 of FIGS. 1 and 3. The UE may be configured for wireless communications.

Method 1000 begins at 1010 with receiving (e.g., using controller/processor 380, antenna 352, receive processor 358, receive MIMO detector 356, transceiver 354, or memory 382) DCI that includes an indication to transmit a PUSCH communication, associated with the DCI, using an SFN communication scheme in which each layer of the PUSCH communication is transmitted simultaneously using multiple antenna modules of the UE.

Method 1000 then proceeds to step 1020 with transmitting (e.g., using controller/processor 380, antenna 352, transmit processor 364, transmit MIMO processor 366, or transceiver 354) the PUSCH communication in accordance with the DCI.

In a first aspect, the indication indicates whether the PUSCH communication is to be transmitted using a first sounding reference signal (SRS) resource set using a first antenna module of the multiple antenna modules, a second SRS resource set using a second antenna module of the multiple antenna modules, or both the first SRS resource set and the second SRS resource set using the first antenna module and the second module.

In a second aspect, alone or in combination with the first aspect, a first value of the indication indicates that a first set of transmission parameters is to be used for the transmission of the PUSCH communication simultaneously using the multiple antenna modules, or a second value of the indication indicates that a second set of transmission parameters is to be used for transmission of the PUSCH communication simultaneously using the multiple antenna modules.

In a third aspect, alone or in combination with one or more of the first and second aspects, a first value of the indication indicates that the PUSCH communication is to be transmitted using a first SRS resource set using a first antenna module or a second value of the indication indicates that the PUSCH communication is to be transmitted using the first SRS resource set and a second SRS resource set using the multiple antenna modules.

In a fourth aspect, alone or in combination with one or more of the first through third aspects, the indication indicates a particular communication scheme for transmitting the PUSCH communication, wherein the particular communication scheme is one of the SFN communication scheme, a time division multiplexing (TDM) communication scheme, a spatial division multiplexing (SDM) communication scheme, a frequency division multiplexing (FDM) communication scheme, or a single transmission reception point (TRP) communication scheme.

In a fifth aspect, alone or in combination with one or more of the first through fourth aspects, the indication indicates a switching arrangement associated with the particular communication scheme.

In a sixth aspect, alone or in combination with one or more of the first through fifth aspects, the indication is based at least in part on a configuration of at least one of the SFN communication scheme, a first SRS resource set, or a second SRS resource set.

In a seventh aspect, alone or in combination with one or more of the first through sixth aspects, the configuration is specific to a bandwidth part, a carrier, or a configured grant.

In an eighth aspect, alone or in combination with one or more of the first through seventh aspects, the configuration is specific to a DCI format.

In a ninth aspect, alone or in combination with one or more of the first through eighth aspects, the configuration indicates a plurality of communication schemes including the SFN communication scheme, and the indication indicates a selected communication scheme of the plurality of communication schemes.

In a tenth aspect, alone or in combination with one or more of the first through ninth aspects, method 1000 includes transmitting capability information indicating that the UE supports the SFN communication scheme.

In an eleventh aspect, alone or in combination with one or more of the first through tenth aspects, the capability information is specific to a band, a UE, a band combination, or a feature set.

Figure 12:
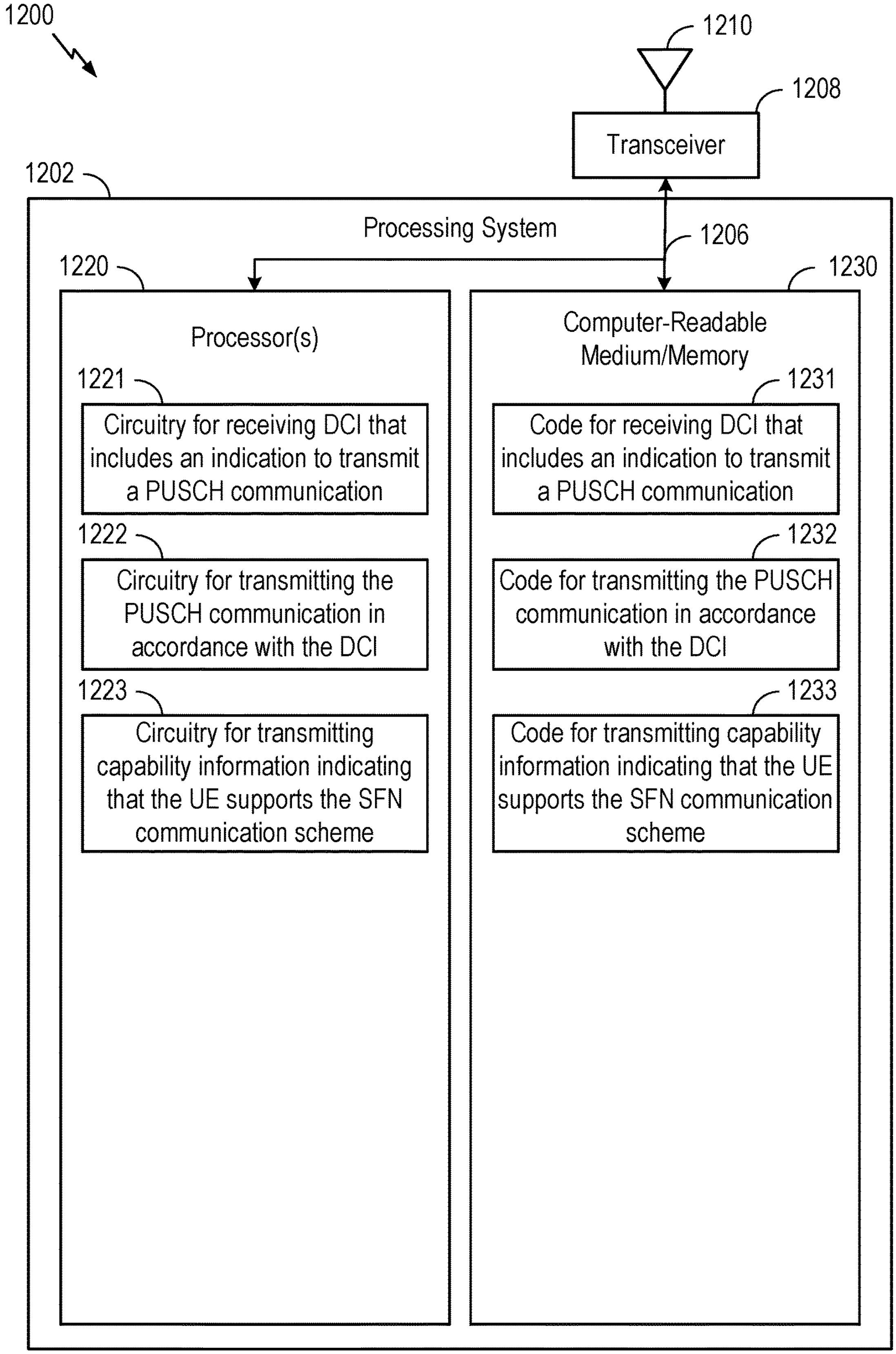
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000.

Communications device 1200 is described below in further detail.

Note that FIG. 10 is just one example of a method, and other methods including fewer, additional, or alternative steps are possible consistent with this disclosure.

Example Operations of a Network Entity

Figure 11:
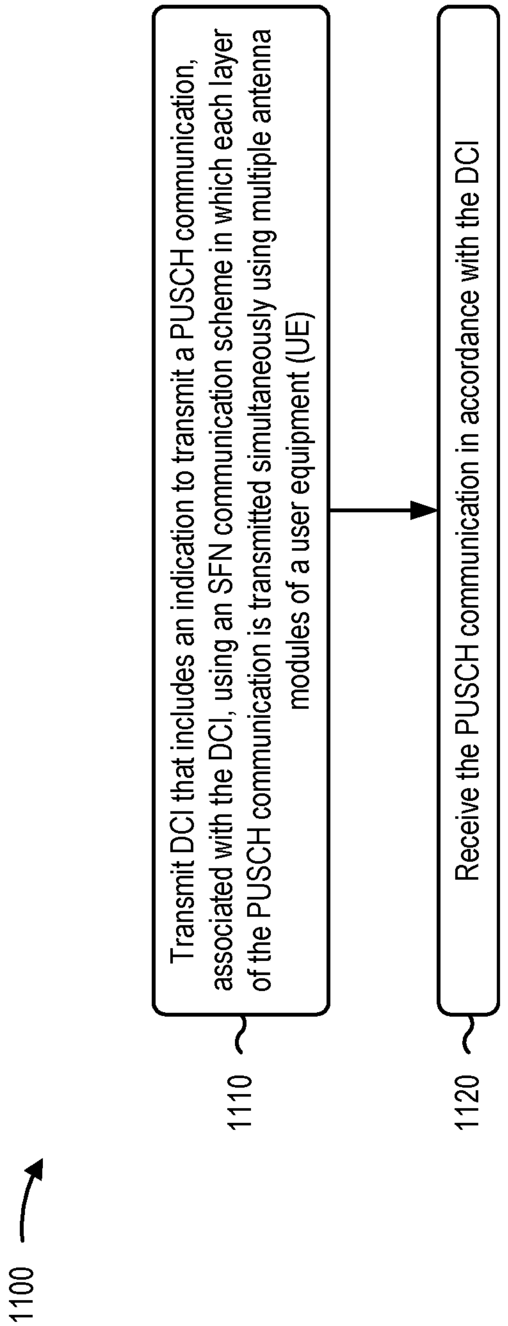
FIG. 11 depicts a method for wireless communications.

FIG. 11 shows a method 1100 for wireless communications by a network entity, such as BS 110 of FIGS. 1 and 3, or a disaggregated base station as discussed with respect to FIG. 2. The network entity may be configured for wireless communications.

Method 1100 begins at 1110 with transmitting (e.g., using antenna 334, transceiver 332, transmit processor 320, transmit MIMO processor 330, and/or controller/processor 340) DCI that includes an indication to transmit a PUSCH communication, associated with the DCI, using an SFN communication scheme in which each layer of the PUSCH communication is transmitted simultaneously using multiple antenna modules of the UE.

Method 1100 then proceeds to step 1120 with receiving (e.g., using antenna 334, transceiver 332, receive MIMO detector 336, receive processor 338, and/or controller/processor 340) the PUSCH communication in accordance with the DCI.

In a first aspect, the indication indicates whether the PUSCH communication is to be transmitted using a first SRS resource set using a first antenna module of the multiple antenna modules, a second SRS resource set using a second antenna module of the multiple antenna modules, or both the first SRS resource set and the second SRS resource set using the first antenna module and the second module.

In a second aspect, alone or in combination with the first aspect, a first value of the indication indicates that a first set of transmission parameters is to be used for the transmission of the PUSCH communication simultaneously using the multiple antenna modules, or a second value of the indication indicates that a second set of transmission parameters is to be used for transmission of the PUSCH communication simultaneously using the multiple antenna modules.

In a third aspect, alone or in combination with one or more of the first and second aspects, a first value of the indication indicates that the PUSCH communication is to be transmitted using a first SRS resource set using a first antenna module, or a second value of the indication indicates that the PUSCH communication is to be transmitted using the first SRS resource set and a second SRS resource set using the multiple antenna modules.

In a fourth aspect, alone or in combination with one or more of the first through third aspects, the indication indicates a particular communication scheme for transmitting the PUSCH communication, wherein the particular communication scheme is one of the SFN communication scheme, a TDM communication scheme, an SDM communication scheme, an FDM communication scheme, or a single TRP communication scheme.

In a fifth aspect, alone or in combination with one or more of the first through fourth aspects, the indication indicates a switching arrangement associated with the particular communication scheme.

In a sixth aspect, alone or in combination with one or more of the first through fifth aspects, the indication is based at least in part on a configuration of at least one of the SFN communication scheme, a first SRS resource set, or a second SRS resource set.

In a seventh aspect, alone or in combination with one or more of the first through sixth aspects, the configuration is specific to a bandwidth part, a carrier, or a configured grant.

In an eighth aspect, alone or in combination with one or more of the first through seventh aspects, the configuration is specific to a DCI format.

In a ninth aspect, alone or in combination with one or more of the first through eighth aspects, the configuration indicates a plurality of communication schemes including the SFN communication scheme, and the indication indicates a selected communication scheme of the plurality of communication schemes.

In a tenth aspect, alone or in combination with one or more of the first through ninth aspects, method 1100 includes receiving capability information indicating that the UE supports the SFN communication scheme, wherein the DCI is based at least in part on the capability information.

In an eleventh aspect, alone or in combination with one or more of the first through tenth aspects, the capability information is specific to a band, a UE, a band combination, or a feature set.

Figure 13:
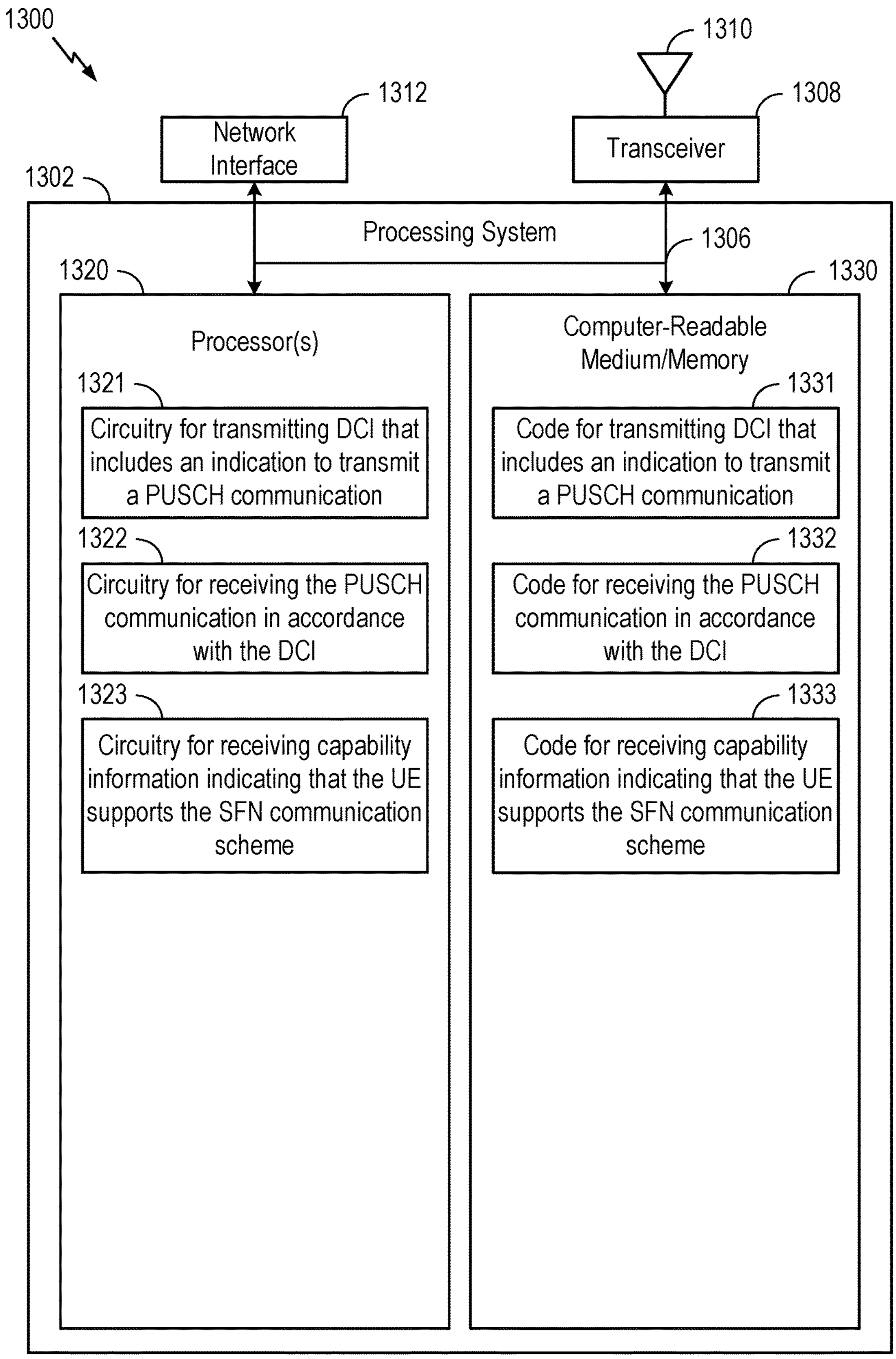
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100.

Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a UE, such as UE 120 described above with respect to FIGS. 1 and 3.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 358, transmit processor 364, TX MIMO processor 366, and/or controller/processor 380, as described with respect to FIG. 3. The one or more processors 1220 are coupled to a computer-readable medium/memory 1230 via a bus 1206. In certain aspects, the computer-readable medium/memory 1230 is configured to store instructions (e.g., computer-executable code) that when executed by the one or more processors 1220, cause the one or more processors 1220 to perform the method 1000 described with respect to FIG. 10, or any aspect related to it. Note that reference to a processor performing a function of communications device 1200 may include one or more processors performing that function of communications device 1200.

In the depicted example, computer-readable medium/memory 1230 stores code (e.g., processor-executable instructions) for receiving DCI that includes an indication to transmit a PUSCH communication 1231, code for transmitting the PUSCH communication in accordance with the DCI 1232, and code for transmitting capability information indicating that the UE supports the SFN communication scheme 1233. Processing of the code 1231-1233 may cause the communications device 1200 to perform the method 1000 described with respect to FIG. 10, or any aspect related to it.

The one or more processors 1220 include circuitry configured to implement (e.g., execute) the code stored in the computer-readable medium/memory 1230, including circuitry for receiving DCI that includes an indication to transmit a PUSCH communication 1221, circuitry for transmitting the PUSCH communication in accordance with the DCI 1222, and circuitry for transmitting capability information indicating that the UE supports the SFN communication scheme 1223. Processing with circuitry 1221-1223 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending, or outputting for transmission may include the transceivers 354 and/or antenna(s) 352 of the UE 120 illustrated in FIG. 3 and/or transceiver 1208 and antenna 1210 of the communications device 1200 in FIG. 12. Means for receiving or obtaining may include the transceivers 354 and/or antenna(s) 352 of the UE 120 illustrated in FIG. 3 and/or transceiver 1208 and antenna 1210 of the communications device 1200 in FIG. 12.

FIG. 13 depicts aspects of an example communications device. In some aspects, communications device 1300 is a network entity, such as BS 110 of FIGS. 1 and 3, or a disaggregated base station as discussed with respect to FIG. 2.

The communications device 1300 includes a processing system 1302 coupled to a transceiver 1308 (e.g., a transmitter and/or a receiver) and/or a network interface 1312. The transceiver 1308 is configured to transmit and receive signals for the communications device 1300 via an antenna 1310, such as the various signals as described herein. The network interface 1312 is configured to obtain and send signals for the communications device 1300 via communications link(s), such as a backhaul link, midhaul link, and/or fronthaul link as described herein, such as with respect to FIG. 2. The processing system 1302 may be configured to perform processing functions for the communications device 1300, including processing signals received and/or to be transmitted by the communications device 1300.

The processing system 1302 includes one or more processors 1320. In various aspects, one or more processors 1320 may be representative of one or more of receive processor 338, transmit processor 320, TX MIMO processor 330, and/or controller/processor 340, as described with respect to FIG. 3. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the method 1100 described with respect to FIG. 11, or any aspect related to it. Note that reference to a processor of communications device 1300 performing a function may include one or more processors of communications device 1300 performing that function.

In the depicted example, the computer-readable medium/memory 1330 stores code (e.g., processor-executable instructions) for transmitting DCI that includes an indication to transmit a PUSCH communication 1331, code for receiving the PUSCH communication in accordance with the DCI 1332, and/or code for receiving capability information indicating that the UE supports the SFN communication scheme 1333. Processing of the code 1331-1333 may cause the communications device 1300 to perform the method 1100 described with respect to FIG. 11, or any aspect related to it.

The one or more processors 1320 include circuitry configured to implement (e.g., execute) the code stored in the computer-readable medium/memory 1330, including circuitry for transmitting DCI that includes an indication to transmit a PUSCH communication 1321, circuitry for receiving the PUSCH communication in accordance with the DCI 1322, and circuitry for receiving capability information indicating that the UE supports the SFN communication scheme 1323. Processing with circuitry 1321-1323 may cause the communications device 1300 to perform the method 1100 as described with respect to FIG. 11, or any aspect related to it.

Various components of the communications device 1300 may provide means for performing the method 1100 as described with respect to FIG. 11, or any aspect related to it. Means for transmitting, sending, or outputting for transmission may include the transceivers 332 and/or antenna(s) 334 of the BS 110 illustrated in FIG. 3 and/or transceiver 1308 and antenna 1310 of the communications device 1300 in FIG. 13. Means for receiving or obtaining may include the transceivers 332 and/or antenna(s) 334 of the BS 110 illustrated in FIG. 3 and/or transceiver 1308 and antenna 1310 of the communications device 1300 in FIG. 13.

EXAMPLE CLAUSES

Implementation examples are described in the following numbered clauses:

Clause 1: A method of wireless communication performed by a user equipment (UE), comprising: receiving downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously using multiple antenna modules of the UE; and transmitting the PUSCH communication in accordance with the DCI.

Clause 2: The method of Clause 1, wherein the indication indicates whether the PUSCH communication is to be transmitted using a first sounding reference signal (SRS) resource set using a first antenna module of the multiple antenna modules, a second SRS resource set using a second antenna module of the multiple antenna modules, or both the first SRS resource set and the second SRS resource set using the first antenna module and the second module.

Clause 3: The method of any of Clauses 1-2, wherein a first value of the indication indicates that a first set of transmission parameters is to be used for the transmission of the PUSCH communication simultaneously using the multiple antenna modules, or a second value of the indication indicates that a second set of transmission parameters is to be used for transmission of the PUSCH communication simultaneously using the multiple antenna modules.

Clause 4: The method of any of Clauses 1-3, wherein a first value of the indication indicates that the PUSCH communication is to be transmitted using a first sounding reference signal (SRS) resource set using a first antenna module or a second value of the indication indicates that the PUSCH communication is to be transmitted using the first SRS resource set and a second SRS resource set using the multiple antenna modules.

Clause 5: The method of any of Clauses 1-4, wherein the indication indicates a particular communication scheme for transmitting the PUSCH communication, wherein the particular communication scheme is one of: the SFN communication scheme, a time division multiplexing (TDM) communication scheme, a spatial division multiplexing (SDM) communication scheme, a frequency division multiplexing (FDM) communication scheme, or a single transmission reception point (TRP) communication scheme.

Clause 6: The method of Clause 5, wherein the indication indicates a switching arrangement associated with the particular communication scheme.

Clause 7: The method of any of Clauses 1-6, wherein the indication is based at least in part on a configuration of at least one of the SFN communication scheme, a first sounding reference signal (SRS) resource set, or a second SRS resource set.

Clause 8: The method of Clause 7, wherein the configuration is specific to a bandwidth part, a carrier, or a configured grant.

Clause 9: The method of Clause 7, wherein the configuration is specific to a DCI format.

Clause 10: The method of Clause 7, wherein the configuration indicates a plurality of communication schemes including the SFN communication scheme, and wherein the indication indicates a selected communication scheme of the plurality of communication schemes.

Clause 11: The method of any of Clauses 1-10, further comprising transmitting capability information indicating that the UE supports the SFN communication scheme.

Clause 12: The method of Clause 11, wherein the capability information is specific to a band, a UE, a band combination, or a feature set.

Clause 13: A method of wireless communication performed by a network entity, comprising: transmitting downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously using multiple antenna modules of a user equipment (UE); and receiving the PUSCH communication in accordance with the DCI.

Clause 14: The method of Clause 13, wherein the indication indicates whether the PUSCH communication is to be transmitted using a first sounding reference signal (SRS) resource set using a first antenna module of the multiple antenna modules, a second SRS resource set using a second antenna module of the multiple antenna modules, or both the first SRS resource set and the second SRS resource set from the first antenna module and the second module.

Clause 15: The method of any of Clauses 13-14, wherein a first value of the indication indicates that a first set of transmission parameters is to be used for the transmission of the PUSCH communication simultaneously using the multiple antenna modules, or a second value of the indication indicates that a second set of transmission parameters is to be used for transmission of the PUSCH communication simultaneously using the multiple antenna modules.

Clause 16: The method of any of Clauses 13-15, wherein a first value of the indication indicates that the PUSCH communication is to be transmitted using a first sounding reference signal (SRS) resource set using a first antenna module, or a second value of the indication indicates that the PUSCH communication is to be transmitted using the first SRS resource set and a second SRS resource set using the multiple antenna modules.

Clause 17: The method of any of Clauses 13-16, wherein the indication indicates a particular communication scheme for transmitting the PUSCH communication, wherein the particular communication scheme is one of: the SFN communication scheme, a time division multiplexing (TDM) communication scheme, a spatial division multiplexing (SDM) communication scheme, a frequency division multiplexing (FDM) communication scheme, or a single transmission reception point (TRP) communication scheme.

Clause 18: The method of Clause 17, wherein the indication indicates a switching arrangement associated with the particular communication scheme.

Clause 19: The method of any of Clauses 13-18, wherein the indication is based at least in part on a configuration of at least one of the SFN communication scheme, a first sounding reference signal (SRS) resource set, or a second SRS resource set.

Clause 20: The method of Clause 19, wherein the configuration is specific to a bandwidth part, a carrier, or a configured grant.

Clause 21: The method of Clause 19, wherein the configuration is specific to a DCI format.

Clause 22: The method of Clause 19, wherein the configuration indicates a plurality of communication schemes including the SFN communication scheme, and wherein the indication indicates a selected communication scheme of the plurality of communication schemes.

Clause 23: The method of any of Clauses 13-22, further comprising receiving capability information indicating that the UE supports the SFN communication scheme, wherein the DCI is based at least in part on the capability information.

Clause 24: The method of Clause 23, wherein the capability information is specific to a band, a UE, a band combination, or a feature set.

Clause 25: An apparatus, comprising: a memory comprising processor-executable instructions; and a processor configured to execute the processor-executable instructions and cause the apparatus to perform a method in accordance with any one of Clauses 1-23.

Clause 26: An apparatus, comprising means for performing a method in accordance with any one of Clauses 1-23.

Clause 27: A non-transitory computer-readable medium comprising executable instructions that, when executed by a processor of an apparatus, cause the apparatus to perform a method in accordance with any one of Clauses 1-23.

Clause 28: A computer program product embodied on a computer-readable storage medium comprising code for performing a method in accordance with any one of Clauses 1-23.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a user equipment (UE), comprising:

receiving downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously using multiple antenna modules of the UE, wherein:

the indication is based at least in part on radio resource control (RRC) configuration information that configures the SFN communication scheme, the RRC configuration information indicates a first sounding reference signal (SRS) resource set and a second SRS resource set for the SFN communication scheme, a first value of the indication indicates that the PUSCH communication is to be transmitted using the first SRS resource set, a second value of the indication indicates that the PUSCH communication is to be transmitted using the second SRS resource set, a third value of the indication indicates that the PUSCH communication is to be transmitted using the first SRS resource set and the second SRS resource set, and a fourth value of the indication is reserved; and transmitting the PUSCH communication in accordance with the DCI.

2. The method of claim 1, wherein the indication indicates whether the PUSCH communication is to be transmitted using a first SRS resource set using a first antenna module of the multiple antenna modules, a second SRS resource set using a second antenna module of the multiple antenna modules, or both the first SRS resource set and the second SRS resource set using the first antenna module and the second antenna module.

3. The method of claim 1, wherein the third value of the indication indicates that a first set of transmission parameters is to be used for a transmission of the PUSCH communication simultaneously using the multiple antenna modules.

4. The method of claim 1, wherein the indication indicates a particular communication scheme for transmitting the PUSCH communication, wherein:

the first value indicates a single transmission reception point (STRP) communication scheme with the first SRS resource set, the second value indicates the sTRP communication scheme with the second SRS resource set, the third value indicates the SFN communication scheme, and at least one other value indicates a time division multiplexing (TDM) communication scheme, a spatial division multiplexing (SDM) communication scheme, a frequency division multiplexing (FDM) communication scheme, or a single transmission reception point (TRP) communication scheme.

5. The method of claim 1, wherein the indication indicates the third value for the SFN communication scheme, and wherein a first SRS resource indicator (SRI) field and a first transmitted precoding matrix indicator (TPMI) field are associated with the first SRS resource set, and a second SRI field and a second TPMI field are associated with the second SRS resource set.

6. The method of claim 1, wherein the RRC configuration information is specific to a bandwidth part, a carrier, or a configured grant.

7. The method of claim 1, wherein the RRC configuration information is specific to a DCI format.

8. The method of claim 1, wherein the RRC configuration information indicates a plurality of communication schemes including the SFN communication scheme, and wherein the indication indicates a selected communication scheme of the plurality of communication schemes.

9. The method of claim 1, further comprising transmitting capability information indicating that the UE supports the SFN communication scheme.

10. The method of claim 9, wherein the capability information is specific to a band, the UE, a band combination, or a feature set.

11. A method of wireless communication performed by a network entity, comprising:

transmitting downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously using multiple antenna modules of a user equipment (UE), wherein:

the indication is based at least in part on radio resource control (RRC) configuration information that configures the SFN communication scheme, the RRC configuration information indicates a first sounding reference signal (SRS) resource set and a second SRS resource set for the SFN communication scheme, a first value of the indication indicates that the PUSCH communication is to be transmitted using the first SRS resource set, a second value of the indication indicates that the PUSCH communication is to be transmitted using the second SRS resource set, a third value of the indication indicates that the PUSCH communication is to be transmitted using the first SRS resource set and the second SRS resource set, and a fourth value of the indication is reserved; and receiving the PUSCH communication in accordance with the DCI.

12. A user equipment (UE) configured for wireless communications, comprising: a processing system that includes one or more processors and a memory coupled with the one or more processors, the processing system configured to cause the UE to:

receive downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously using multiple antenna modules of the UE, wherein:

the indication is based at least in part on radio resource control (RRC) configuration information that configures the SFN communication scheme, the RRC configuration information indicates a first sounding reference signal (SRS) resource set and a second SRS resource set for the SFN communication scheme, a first value of the indication indicates that the PUSCH communication is to be transmitted using the first SRS resource set, a second value of the indication indicates that the PUSCH communication is to be transmitted using the second SRS resource set, a third value of the indication indicates that the PUSCH communication is to be transmitted using the first SRS resource set and the second SRS resource set; and a fourth value of the indication is reserved; and transmit the PUSCH communication in accordance with the DCI.

13. The UE of claim 12, wherein the indication indicates whether the PUSCH communication is to be transmitted using a first SRS resource set using a first antenna module of the multiple antenna modules, a second SRS resource set using a second antenna module of the multiple antenna modules, or both the first SRS resource set and the second SRS resource set using the first antenna module and the second antenna module.

14. The UE of claim 12, wherein the third value of the indication indicates that a first set of transmission parameters is to be used for a transmission of the PUSCH communication simultaneously using the multiple antenna modules.

15. The UE of claim 12, wherein the indication indicates a particular communication scheme for transmitting the PUSCH communication, wherein:

the first value indicates a single transmission reception point (sTRP) communication scheme with the first SRS resource set, the second value indicates the sTRP communication scheme with the second SRS resource set, the third value indicates the SFN communication scheme, and at least one other value indicates a time division multiplexing (TDM) communication scheme, a spatial division multiplexing (SDM) communication scheme, a frequency division multiplexing (FDM) communication scheme, or a single transmission reception point (TRP) communication scheme.

16. The UE of claim 12, wherein the indication indicates the third value for the SFN communication scheme, and wherein a first SRS resource indicator (SRD) field and a first transmitted precoding matrix indicator (TPMI) field are associated with the first SRS resource set and a second SRI field and a second TPMI field are associated with the second SRS resource set.

17. The UE of claim 12, wherein the RRC configuration information is specific to a bandwidth part, a carrier, or a configured grant.

18. The UE of claim 12, wherein the RRC configuration information is specific to a DCI format.

19. The UE of claim 12, wherein the RRC configuration information indicates a plurality of communication schemes including the SFN communication scheme, and wherein the indication indicates a selected communication scheme of the plurality of communication schemes.

20. The UE of claim 12, wherein the processing system is further configured to cause the UE to:

transmit capability information indicating that the UE supports the SFN communication scheme.

21. The UE of claim 20, wherein the capability information is specific to a band, the UE, a band combination, or a feature set.

22. A network entity configured for wireless communications, comprising: a processing system that includes one or more processors and a memory coupled with the one or more processors, the processing system configured to cause the network entity to:

transmit downlink control information (DCI) that includes an indication to transmit a physical uplink shared channel (PUSCH) communication, associated with the DCI, using a single-frequency network (SFN) communication scheme in which each layer of the PUSCH communication is transmitted simultaneously using multiple antenna modules of a user equipment (UE), wherein:

the indication is based at least in part on radio resource control (RRC) configuration information that configures the SFN communication scheme, the RRC configuration information indicates a first sounding reference signal (SRS) resource set and a second SRS resource set for the SFN communication scheme, a first value of the indication indicates that the PUSCH communication is to be transmitted using the first SRS resource set, a second value of the indication indicates that the PUSCH communication is to be transmitted using the second SRS resource set, a third value of the indication indicates that the PUSCH communication is to be transmitted using the first SRS resource set and the second SRS resource set, and a fourth value of the indication is reserved; and receive the PUSCH communication in accordance with the DCI.

* * * * *